(12) United States Patent
Kamada et al.

(10) Patent No.: US 6,668,269 B1
(45) Date of Patent: *Dec. 23, 2003

(54) COMPUTER SYSTEM PROCESS SCHEDULER DETERMINING AND EXECUTING PROCESSES BASED UPON CHANGEABLE PRIORITIES

(75) Inventors: Jun Kamada, Kawasaki (JP); Masanobu Yuhara, Kawasaki (JP); Etsuo Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/474,100

(22) Filed: Dec. 29, 1999

Related U.S. Application Data

(62) Division of application No. 08/621,181, filed on Mar. 21, 1996, now Pat. No. 6,108,683.

(30) Foreign Application Priority Data

Aug. 11, 1995 (JP) ............................................. 7-205424

(51) Int. Cl.[7] ................................................ G06F 9/00
(52) U.S. Cl. ........................ 709/103; 709/102; 709/107
(58) Field of Search ................................. 709/100, 101, 709/102, 103, 104, 105, 106, 108

(56) References Cited

U.S. PATENT DOCUMENTS

| | | |
|---|---|---|
| 5,528,513 A | 6/1996 | Vaitzblit et al. |
| 5,606,695 A | 2/1997 | Dworzseki |
| 6,108,683 A * | 8/2000 | Kamada et al. ............. 709/103 |

OTHER PUBLICATIONS

Inohara et al, "A Thread Facility Based on User/Kernal Cooperation in the XERO Operating System", IEEE, 1991.
Govindan et al, "Scheduling and IPC Mechanisms for Continuous Media", ACM, 1991.
DEC OSF/1 Reference Pages, Section 2– System Calls, DEC 2/94, pp. 1–267 through 1–274.
Anderson et al, "Scheduler Activations: Effective Kernel Support for the User–Level Management of Parallelism", ACM, 1991.

* cited by examiner

*Primary Examiner*—Majid A. Banankhah
(74) *Attorney, Agent, or Firm*—Staas & Halsey LLP

(57) ABSTRACT

A computer-system fixed-priority process scheduler that is supported by an operating system (OS) and establishes fixed priorities respectively corresponding to a plurality of processes to be scheduled. Further, the priorities can be changed by designation from the user processes. The process scheduler allocates a central processing unit (CPU) to executable ones of the processes in the descending order of the priorities thereof. Moreover, a user-level process scheduler is provided in a fixed-priority process scheduler space, namely, in a real-time class process scheduler space. The user-level process scheduler has a first priority of a real time class. Furthermore, the user-level process scheduler performs the scheduling of a group of other user processes, which have priorities lower than the first priority, and causes the group of such user processes to operate or run. Namely, the user-level process scheduler determines the allocation of the CPU to such user processes and requests the OS to execute such user processes.

29 Claims, 29 Drawing Sheets

| PROCESS IDENTIFIER | OPERATING TIME OF CPU IN CYCLE (ms) |
|---|---|
| A | 50 |
| B | 20 |
| C | 10 |
| UNUSED | — |
| UNUSED | — |

| START TIME | TERMINATION TIME | SCHEDULING DISCIPLINE |
|---|---|---|
| 00 : 00 : 00 | 00 : 00 : 30 | TIME SHARING CLASS |
| 00 : 00 : 30 | 00 : 10 : 00 | REAL TIME CLASS |
| 00 : 10 : 00 | 00 : 10 : 30 | TIME SHARING CLASS |

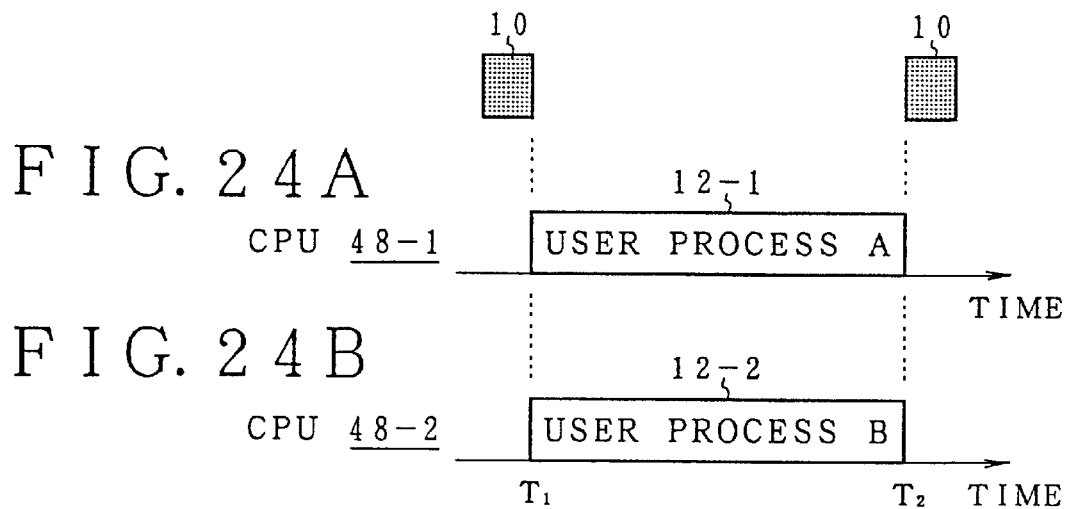
FIG. 24A
FIG. 24B
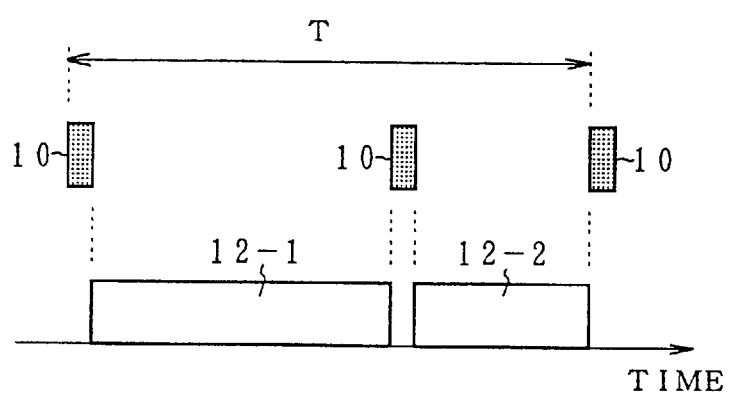
FIG. 25

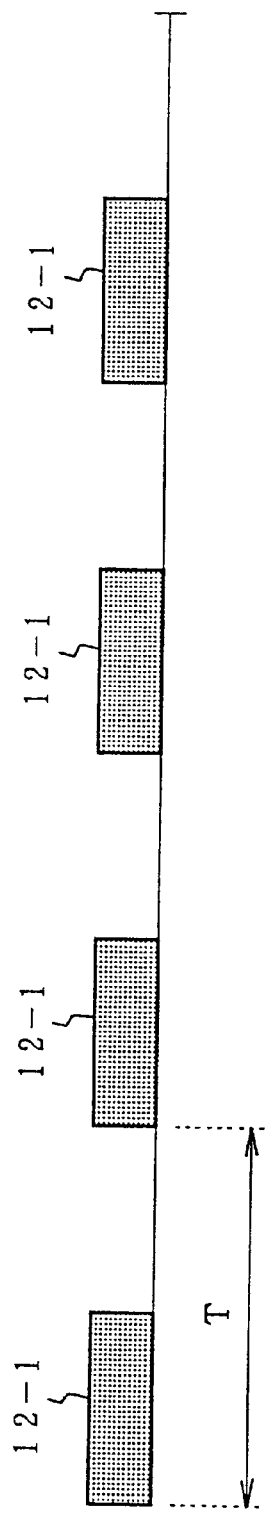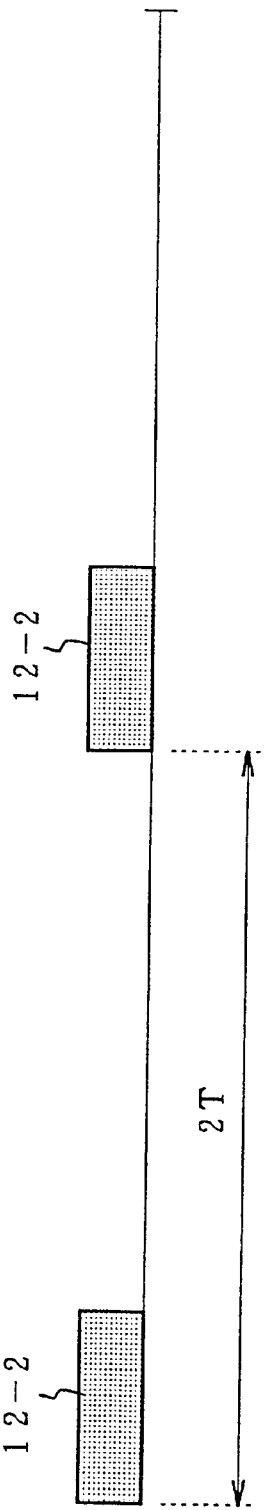

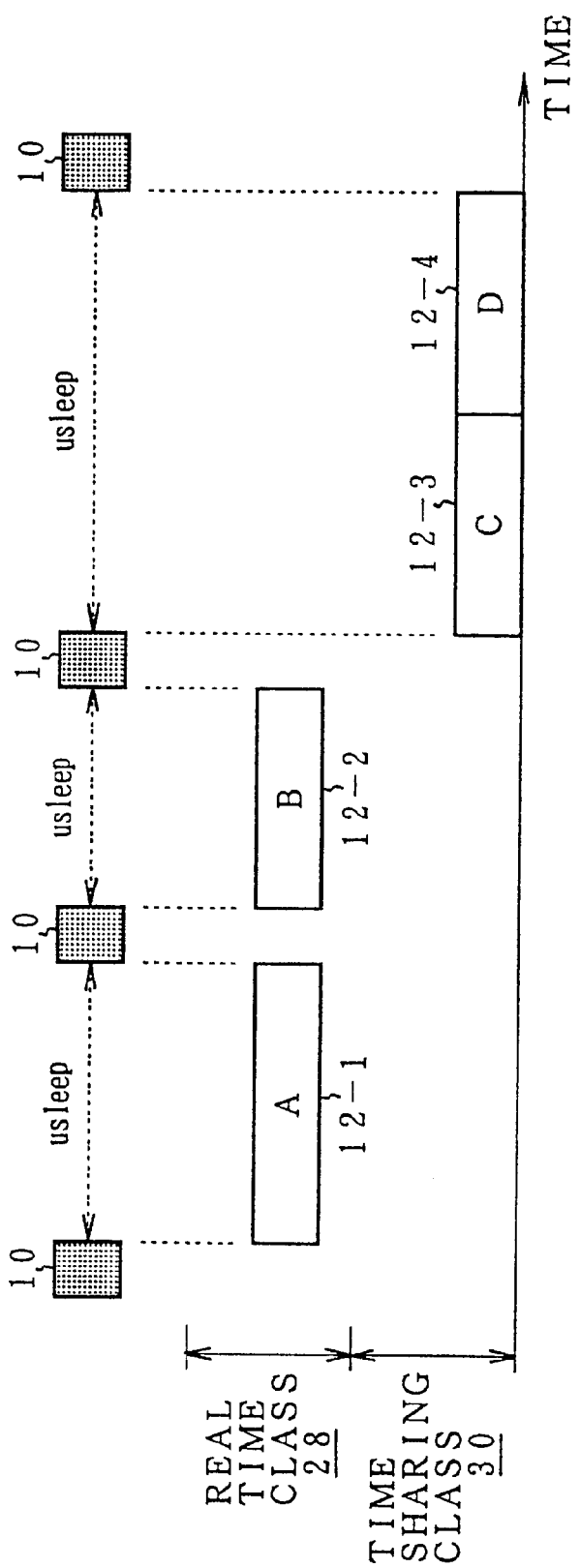

COMPUTER SYSTEM PROCESS SCHEDULER DETERMINING AND EXECUTING PROCESSES BASED UPON CHANGEABLE PRIORITIES

This application is a divisional of application Ser. No. 08/621,181, filed Mar. 21, 1996, now U.S. Pat. No. 6,108,683.

BACKGROUND OF THE INVENTION

1. Field of the Invention

The present invention generally relates to a process scheduler for a computer system (hereunder sometimes referred to as a computer-system process scheduler), which uses a process scheduler supported by an operating system so as to cause a user-level process scheduler to function. More particularly, the present invention relates to a computer-system process scheduler that uses a process scheduler, which establishes fixed priorities respectively corresponding to a plurality of processes to be scheduled (namely, objects of scheduling) and next allocates a central processing unit (CPU) to a plurality of executable processes in the descending order of the priorities thereof and further causes the CPU to operate, so as to allow a user-level process scheduler to function.

2. Description of the Related Art

Generally, a plurality of programs are executed concurrently in a computer, so that a plurality of executable units (namely, run units) named as "processes" are permitted to be present therein. At that time, it is necessary to assign the CPU to each process according to an algorithm. Such assignment of the CPU to a process is referred to as "process scheduling". Conventional process scheduling is-performed in a batch system or by a time-sharing system. Further, conventional process schedulers were created for the purpose of increasing the CPU utilization (efficiency) of the entire system. In the case of time-sharing systems, reduction in response time required to respond to a user's operation (namely, the improvement of response performance) was further taken into account. It, however, has been regarded as being inevitable that the response time becomes long under heavy load conditions of the systems. Thus, there is no guarantee on the utilization of the CPU by user processes. Additionally, in the case of controlling built-in equipment which requires real time processing, all processes to be executed can be known when designed. Consequently, a fixed-priority scheduler, by which fixed priorities are assigned to the processes and a process of a priority higher than the priorities of other processes is preferentially executed, is used.

Meanwhile, with the recent development of multi-media systems, process schedulers for computers have come to handle videos and audios. In order to reproduce videos and audios smoothly, certain processes should be carried out securely at predetermined time intervals. In the case of such a conventional multi-media system, the conventional scheduling has the following problems:

I. In the case of the scheduling performed in the conventional batch system or in the conventional time-sharing system, there is no guarantee concerning when and how a CPU can-be utilized therein. In the case of employing such scheduling, the CPU cannot be utilized when a multi-media application program becomes necessary. As a result, when reproducing video data, a moving object generated in reproduced images does not appear to move smoothly.

II. The multi-media application programs are different from programs for controlling the built-in equipment in that the multi-media application programs cannot predict what processes or programs will be executed. The multi-media application programs, therefore, cannot preliminarily establish the priorities of processes (namely, assign the priorities to the processes, respectively). The conventional scheduling, which uses fixed priorities, cannot achieve the purpose of the schedulers. This problem also arises in the case of employing a rate monotonic scheduling method by which, among periodic processes, a process having a period shorter than those of the other processes is preferentially executed.

III. The multi-media application programs are further different from programs for controlling the built-in equipment in that the reliability of a run of the multi-media application is low. For example, if a certain multi-media application program permanently uses a CPU on purpose or by mistake, programs having priorities lower than that of the process occupying the CPU do not run at all in the case that the scheduling is performed by using the fixed priorities. An occurrence of such a situation is not allowed in a general-purpose multi-media system.

For the aforementioned reasons, there has now emerged a need for a new process scheduling method which is available in a multi-media system. The research and development of such a process scheduling method are currently pursued. Incidentally, there are two cases or manners of introducing a new process scheduler, which is suitable for a multi-media system, thereinto. Namely, in a first case, the process scheduling is performed in an operating system. Further, in a second case, the process scheduling is carried out by a user program which runs or operates on (namely, under the control of) an operating system. Hitherto, the following problems, however, have arisen in the case when such a process scheduler is introduced into a multi-media system.

(1) Problems caused when introducing such a new process scheduler into the operating system:

(i) Conventional operating systems do not permit any persons other than developers thereof to add a process scheduler thereto or modify the process scheduler thereof. A source code of the operating system and a development environment, in which the operating system is developed, are necessary for changing the scheduler thereof. In the case of commercial operating systems, generally, persons other than developers thereof cannot get the source codes thereof. Even if a person other than the developers could get the source code of a commercial operating system, he should pay a very expensive royalty fee. Actually, it is impossible for a developer of a multi-media system to modify the process scheduler of the commercial operating system.

(ii) In the case of non-commercial operating systems, persons other than developers thereof may be able to get the source codes of some of the non-commercial operating systems free of charge. However, if the source code of such a non-commercial operating system is obtained, this non-commercial operating system cannot allow a large number of application programs to run. Moreover, there is a problem in a system to support users or the persons who have got the source codes. The present conditions, therefore, do not permit non-experts of an operating system for a computer to utilize non-commercial operating systems.

(iii) Whether an operating system to be modified is a commercial one or a non-commercial one, general knowledge concerning an operating system and comprehension of an operating-system installing method peculiar to the operating system are required to modify the operating system.

(2) Problems caused when introducing the new process scheduler into the operating system by executing a user program:

(i) There has been a method for realizing a pseudo process (namely, a user-level thread) in a user own process by a user program or a library utilized by a user program and for scheduling of user-level threads. This method, however, can perform the scheduling only in the process. Therefore, in the case that there are other groups of processes which utilize a CPU required by a multi-media system, the utilization of the CPU required by the multi-media system cannot be ensured.

(ii) Further, there has been a method by which a user program becomes a scheduler and this scheduler gives a user process a priority used by a fixed-priority scheduler which is supported by an operating system. Namely, this method utilizes the scheduling (function) provided by the operating system. Consequently, the utilization of the CPU in the user process needed by the multi-media system cannot be ensured.

(iii) Generally, the modification of the user program becomes further necessary in the aforementioned cases of (2)(i) and (2)(ii).

As is understood from the foregoing description, in the case of the conventional process schedulers, it is very difficult to introduce a new (conventional) process scheduler, which is required by a multi-media system, thereinto.

The present invention is accomplished to solve the aforementioned problems of the conventional process schedulers.

SUMMARY OF THE INVENTION

In accordance with the present invention, there is provided a computer(-system) process scheduler which can ensure the utilization of a CPU in a user process required by a multi-media system while the scheduling is carried out by means of a user program by utilizing a scheduler supported by an operating system.

The computer-system process scheduler (hereunder sometimes referred to simply as a computer process scheduler) of the present invention is based on the premise that this computer process scheduler is the following fixed-priority process scheduler. Namely, the computer process scheduler is supported by an operating system (OS) and establishes fixed priorities respectively corresponding to processes to be scheduled. Further, the priorities can be changed by designation sent from a user process and that the computer process scheduler allocates a CPU to executable ones of the processes in the descending order of the priorities thereof and causes the process, to which the CPU is allocated, to operate or run. The computer process scheduler of the present invention is characterized in that a user-level process scheduler is provided in such a fixed-priority process scheduler, namely, in a real-time-class process scheduler. The user-level process scheduler has a real-time-class first priority of 159 and is operative to schedule other processes, each of which has a priority lower than the first priority of 159 and to cause the latter processes to operate or run. Namely, the user-level process scheduler determines the allocation of the CPU thereto and requests the operating system to execute the user process.

A practical embodiment of the computer process scheduler of the present invention may be a distributed (type) computer process scheduler, by which a user-level process scheduler is linked to each of a plurality of user processes having the first priority of 159 and is operative to schedule the user process corresponding thereto and cause the corresponding user process to operate or run.

Further, another practical embodiment of the computer process scheduler of the present invention may be a hierarchical (or layer type) computer process scheduler, by which the user-level process scheduler having the first priority of 159 provides or establishes a user-level process scheduler of a second priority in a group of user processes scheduled by the scheduler having the first priority and is operative to hierarchically schedule other groups of user processes from those of high-order groups to those of low-order groups and cause these groups of the user processes to operate or run. Incidentally, this hierarchical technique or method may be applied to the aforementioned distributed type scheduler. Namely, this practical embodiment of the present invention may be of the hierarchically distributed type.

Moreover, in the case of still anther practical embodiment of the present invention, there are provided a plurality of user-level process schedulers having the first priority, each of which individually schedules a corresponding group of user processes and causes the corresponding group of user processes to operate or run.

Each of the user-level process scheduler has a process execution control portion that is operative to request the operating system to execute, halt (or suspend) or resume a user process designated according to an instruction, which is based on a request or demand from a user process and is sent from a class change instructing portion, or another instruction which is issued from a process execution instructing portion by referring to a process management table. Moreover, each of the user-level process scheduler has a process priority control portion that is operative to request the operating system to execute, halt (or suspend) or resume a user process designated according to an instruction, which is based on a request or demand from a user process and is sent from a class change instructing portion, or another instruction, which is issued from a process execution instructing portion by referring to a process management table, in such a manner as to execute a designated user process A by changing the priority of the user process A into the first priority and in such a way as to halt (or suspend) another designated user process B by changing the priority of the user process B into a lower priority. Furthermore, each of the user process schedulers has a class change control portion that is operative to request the operating system to change a designated class and to execute, halt (or suspend) or resume the execution of a user process designated according to an instruction, which is based on a request or demand from a user process and is sent from the class change instructing portion, or another instruction, which is issued from the process execution instructing portion by referring to the process management table, in the case that the operating system has a scheduling class, for example, a time sharing class, which is dynamically changed according to the state of a process in the range of low priorities (namely, of 0 to 50) differently from a fixed-priority real time class established in the range of high priorities (namely, of 100 to 159).

Hereat, in response to a demand (or request) for admission, which is issued by a new user process and is accompanied by designation of CPU (utilization) time demanded by the new user process, the class change instructing portion obtains a total of CPU time demanded by one or more user processes, each of which is currently in an admitted state, by referring the process management table. Further, if the total CPU time is equal to or less than a prescribed time of period, the class change instructing portion permits the admission of the new user process. In contrast, if the total CPU time exceeds the prescribed time, the class change instructing portion rejects the admission thereof. Moreover, an admission processing is as follows. Namely, in the case that the class change instructing portion permits the admission of a new user process, the class change instructing portion instructs the process execution control portion to change the state of an admission demanding process (namely, a user process having demanded the admission thereof) into an halted (or suspended) state. Moreover, the class change instructing portion instructs the class change control portion to change the current scheduling class of the admission demanding process into a real time class. Furthermore, the class change instructing portion instructs the process priority control portion to change the priority of the admission demanding process into the second priority. In addition, after the admission demanding process is registered in the process management table, the class change instructing portion posts the permission for the admission to the admission demanding process (namely, notifies the admission demanding process of the permission for admission).

Moreover, another manner of performing the admission processing is as follows. Namely, in the case that the class change instructing portion permits the admission of a new user process, the class change instructing portion instructs the class change control portion to change the current scheduling class of the admission demanding process from the time-sharing class into the real time class. Moreover, the class change instructing portion instructs the process priority control portion to change the priority of the admission demanding process into, for instance, the lowest priority (namely, 100) of the real time class. Furthermore, after the admission demanding process is registered in the process management table, the class change instructing portion posts the permission for the admission to the admission demanding process. Further, still another manner of performing the admission processing is as follows. Namely, in the case that the class change instructing portion permits the admission of a new user process, the class change instructing portion instructs the class change control portion to change the current scheduling class of the admission demanding process into the time sharing class. Moreover, after the admission demanding process is registered in the process management table, the class change instructing portion posts the permission for admission to the admission demanding process.

When a demand (or request) for exit (or withdrawal) is made by a user process, the class change instructing portion deletes this user process from the process management table and further instructs the class change control portion to change the current scheduling class of the user process, which has made the demand for an exit, into the time sharing class. The class change instructing portion can handle the admission and exit of a new user process in response to a notice sent from the user process. Moreover, the class change instructing portion can handle the admission and exit of a new user process in response to a notice sent from the operating system.

Furthermore, in the case of the computer(-system) process scheduler of the present invention, information concerning change requests, which are issued from the user-level process scheduler to the process execution control portion, the class change control portion and the process priority control portion, can be stored in the library. Moreover, in response to a request or instruction from an application program, a corresponding change is requested to the operating system by causing the library to post a message, which represents a request for a corresponding change, to a user-level process scheduler. Furthermore, the specifications of scheduling demands (or requests) for change to be made to the process execution control portion (hereunder sometimes referred to as the scheduling specifications), the class change control portion and the process priority control portion are generated by one of the user processes. A demand for change is posted to the user-level process scheduler on the basis of the scheduling specifications of the user process, and thus the process-scheduler requests the operating system to make the change. Hereupon, a user process to be scheduled by the user-level process scheduler consists of a plurality of threads. Further, the threads are scheduled by a thread scheduler that is a part of the user process.

When allocating the CPU time to one or more user processes registered in the process management table, the user-level process scheduler requests the operating system to execute and suspend (or stop the execution of) the user process and change the priority and the (scheduling) class thereof in such a manner that there is only one user process to which the CPU (time) can be allocated. Further, when allocating the CPU time to one or more user processes registered in the process management table, the user-level process scheduler requests the operating system to execute and suspend the user processes and change the priorities and the (scheduling) classes thereof in such a way that there are a plurality of user processes to which the CPU is allocated in a time sharing manner within a same period of the CPU time. Moreover, the user-level process scheduler ensure the operation or execution of a plurality of user processes within a certain period of time by allocating the CPU time to elements, which include the plurality of user processes and the user-level process scheduler itself, serially within the certain period of time. The user-level process scheduler further ensures the operation or execution of a plurality of user processes by establishing or setting certain periods and repeatedly allotting the CPU time to the elements, which include the plurality of user processes and the user-level process scheduler itself, serially within each of the certain periods. In the case that a plurality of user processes have different operating periods, respectively, the user-level process scheduler determines a combination of the different operating periods as a period, and allots available CPU time to the plurality of user processes serially within this period. Thereby, the user-level process scheduler ensures the execution or operation of each of the plurality of user processes. Furthermore, when the ratio of the CPU time, which is allocated to the plurality of user processes, to a certain time or period is equal to or less than a prescribed or predetermined value, the user-level process scheduler allows the allocation of CPU time to other user processes. Conversely, when such a ratio exceeds the prescribed value, the user-level process scheduler performs an admission control operation of rejecting the allocation of the CPU time to other user processes. In the case that CPU time is allocated to a user process in a certain time or at certain periods (or intervals), the user-level process scheduler may allocate continuous CPU time thereto. Alternatively, the user-level process scheduler may divide the CPU time, which is allocated to a group of a plurality of user processes, into time slices and also may allot time slices to the plurality of user processes, respectively.

In the case that the user processes registered in the process management table include user processes belonging to the fixed-priority real time class, whose priorities are in the range of high priorities (namely, 100 to 159), and further include other user processes belonging to the time sharing class, whose priorities are dynamically changed in the range of low priorities (namely, 0 to 50), the user-level process scheduler restricts the allocation of the CPU time to the user processes belonging to the real time class and allocates the CPU time to the user processes belonging to the time sharing class. The user-level process scheduler detects a halt (or suspension) of the execution of a user process and enables the execution of another user process. When allocating the CPU time to a user process, the user-level process scheduler provides a blocking detection process, which can be executed at the same priority as of the user process, in addition to th user process. Then, when the user process is blocked due to input-output (I/O) waiting or the like, the user-level process scheduler allocates CPU time to a blocking detection process so that the blocking detection process detects an occurrence of blocking and then posts the occurrence of blocking to the user-level process scheduler. Thereby, the user-level process scheduler recognizes that the execution of the user process is halted or stopped. Then, the user-level process scheduler enables another user process to be executed. Moreover, when allocating CPU time to a user process, the user-level process scheduler further provides or establishes a blocking detection process which can be executed at a priority lower than that of the user process. Furthermore, when the user process is blocked owing to I/O waiting or the like, the user-level process scheduler allocates CPU time to this blocking detection process so that the blocking detection process detects an occurrence of blocking and then posts the occurrence of blocking to the user-level process scheduler. Thereby, the user-level process scheduler recognizes that the execution of the user process is halted or stopped. Then, the user-level process scheduler enables another user process to be executed. Additionally, the user-level process scheduler is operative to detect a change of the state of the blocked user process into a ready or executable state, namely, a state in which this user process can be executed. Then, the user-level process scheduler causes this user process to run or operate. In addition, the user-level process scheduler can detect a notice indicating the blocking of a user process by the operating system or indicating the resumption of the blocked user process by recovering the blocked user process. Then, the user-level process scheduler can execute or suspend another user process.

Such a user-level process scheduler of the present invention can obtain the following advantages:

I. There can be realized a scheduler which allocates certain CPU time to a process to be scheduled (namely, an object of the scheduling) and thus ensures the utilization of the CPU by the process.

II. A user process can be scheduled (namely, an object of the scheduling) without modifying a program which has previously been executed. There is no necessity of modifying the program for a new scheduler and of linking the program thereto anew.

III. Source code of an operating system is not necessary for realizing a new scheduler.

IV. The scheduler of the present invention can be utilized under the control of the commercial operating system.

V. Knowledge concerning the inner structure of the operating system is unnecessary for realizing the new scheduler.

VI. When trying various kinds of schedulers, it is unnecessary to restart the system.

VII. There can be realized a scheduler, by which even if a program behaving unreliably is an object of the scheduling, the execution of another program can be performed.

As a result, in accordance with the present invention, various schedulers, such as a scheduler to ensure certain CPU utilization needed for multi-media processing, can be implemented on a commercial operating system. Further, a program behaving unreliably can be employed as an object of the scheduling. Namely, a scheduler, which is equivalent to a scheduler implemented in the operating system, can be implemented as a user-level process scheduler.

Other features, objects and advantages of the present invention will become apparent from the following description of a preferred embodiment with reference to the drawings in which like reference characters designate like or corresponding parts throughout several views.

BRIEF DESCRIPTION OF THE DRAWINGS

FIGS. 24A and 24B are diagrams for illustrating the case that a plurality of CPUs are allocated to user processes and thus the user processes are executed;

FIG. 25 is a diagram for illustrating the case that a plurality of processes are executed within a certain time;

FIGS. 27A and 27B are diagrams for illustrating a plurality of user processes which are different in operating periods from one another;

FIG. 30 is a diagram for illustrating the case that constant CPU time is allocated to each of user processes belonging to the time sharing class;

DETAILED DESCRIPTION OF THE PREFERRED EMBODIMENT

Operating Environment

User-level process schedulers of the present invention can be easily realized on the premise that the fixed-priority scheduling of processes is provided by an operating system. The fixed-priority scheduling has been previously provided in built-in real time operating systems. Further, the fixed-priority scheduling has come to be provided in UNIX System V (incidentally, UNIX is a registered trademark of AT&T in the U.S.A.), Sun OS5, Windows/NT (incidentally, Windows is a registered trademark of Microsoft Corporation in the U.S.A.). Further, POSIX (Portable Operating System Interface for Computer Environments-Interactive Executive (developed by UNIX standard integrating organization (namely, Institute of Electrical and Electronics Engineers) based on UNIX system services)), which has become the standard for operating system interfaces, has specified schedulers for performing the fixed-priority scheduling. Solaris 2.4, namely, an operating system introduced by Sun Microsystems complies with POSIX standard and has a fixed-priority scheduler of a scheduling class called "a real time class". In the case of this real time class, the values of 100 to 159 can be used as priorities. The use of the priorities means that a process having a higher (or larger) priority is preferentially executed. In the following description of an embodiment of the present invention, the operating (or execution) environment based on the operating system "Solaris 2.4" is taken as an example, unless otherwise specified.

Figure 1:
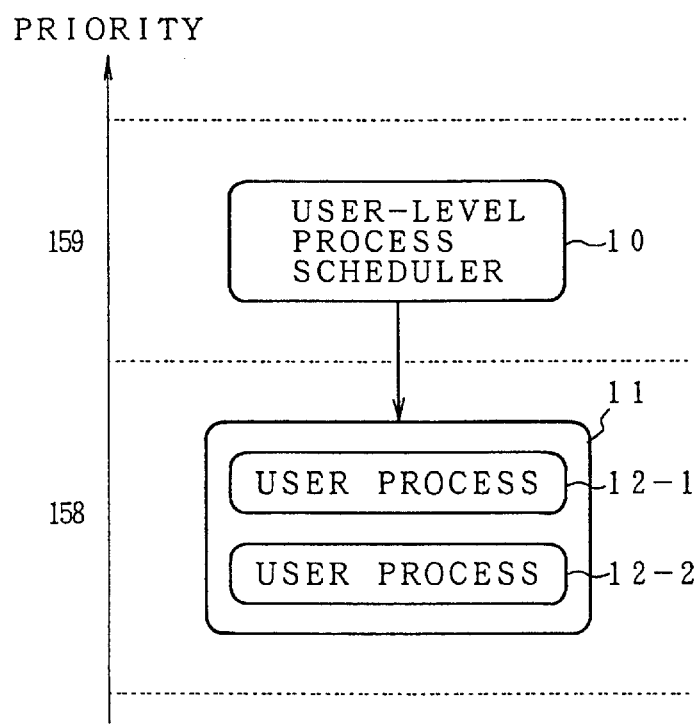
FIG. 1 is a diagram for illustrating the operating environment (or execution environment) of a user-level process scheduler and user processes.

FIG. 1 illustrates a practical example of the operating environment of the user-level process scheduler of the present invention. In a real time class space in the case of the fixed-priority scheduling provided by the operating system, the user-level process scheduler 10 is set in such a manner that this user-level process scheduler operates or runs at the priority of 159, namely, at the highest priority in the case of the real time scheduling and that moreover, user processes 12-1 and 12-2 of a user process group 11 to be scheduled are executed at the priority of 158 which is the second highest priority.

Figure 2:
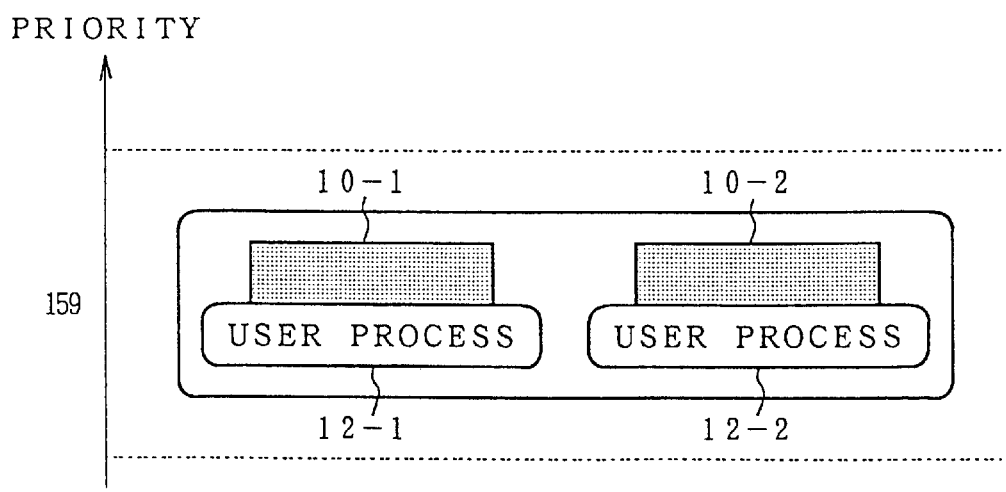
FIG. 2 is a diagram for illustrating the operating environment of parallel type user-level process schedulers and user processes.

FIG. 2 illustrates another example of the operating environment of the user-level process schedulers of the present invention. In the case of this example, the user-level process scheduler operating at the priority of 159 is divided into two schedulers, namely, the user-level process schedulers 10-1 and 10-2. Further, the user-level process schedulers 10-1 and 10-2 are linked to user processes 12-1 and 12-2 as libraries, respectively. The user-level process schedulers 10-1 and 10-2, therefore, control the linked user processes 12-1 and 12-2, respectively.

Figure 3:
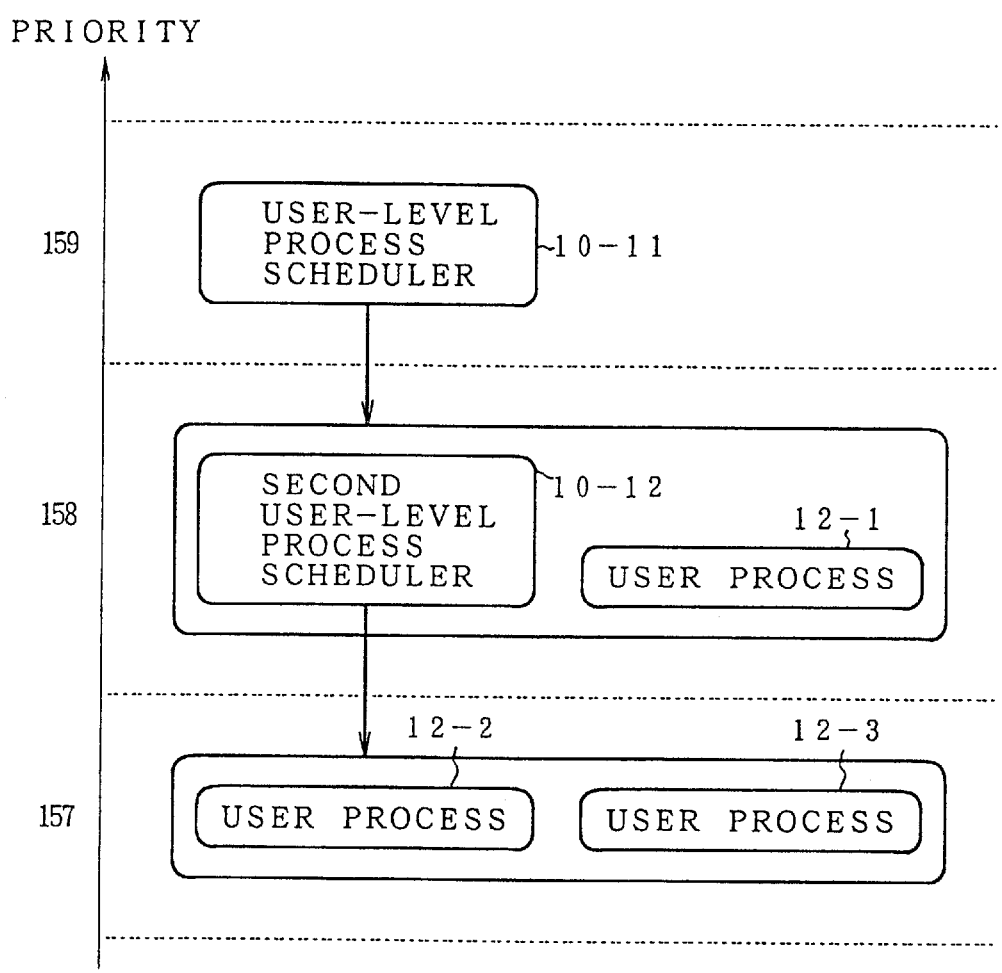
FIG. 3 is a diagram for illustrating the operating environment of hierarchical (type) user-level process schedulers and user processes.

FIG. 3 illustrates another example of the operating environment of hierarchical user-level process schedulers and user processes. A characteristic aspect of this example resides in that the user-level process schedulers carries out the scheduling of the user processes hierarchically. First, the priority of the user-level process scheduler 10-11 is set in such a way that the user-level process scheduler 10-11 operates at the priority of 159, which is a first priority of the real time class. Then, a second user-level process scheduler 10-12, whose priority is set at 158 which is a second priority of the real time class, and a user process 12-1 are provided as objects of the scheduling to be performed by the user-level process scheduler 10-11 whose priority is set at 159. Further, the user-level process scheduler 10-11 causes the respective of the user-level process scheduler 10-12 and the user process 12-1 to operate. Moreover, the second user-level process scheduler 10-12 employs user processes 12-2 and 12-3, whose priorities are set at 157, as objects of the scheduling, and cause the user processes 12-2 and 12-3 at the priority of 157.

Figure 4:
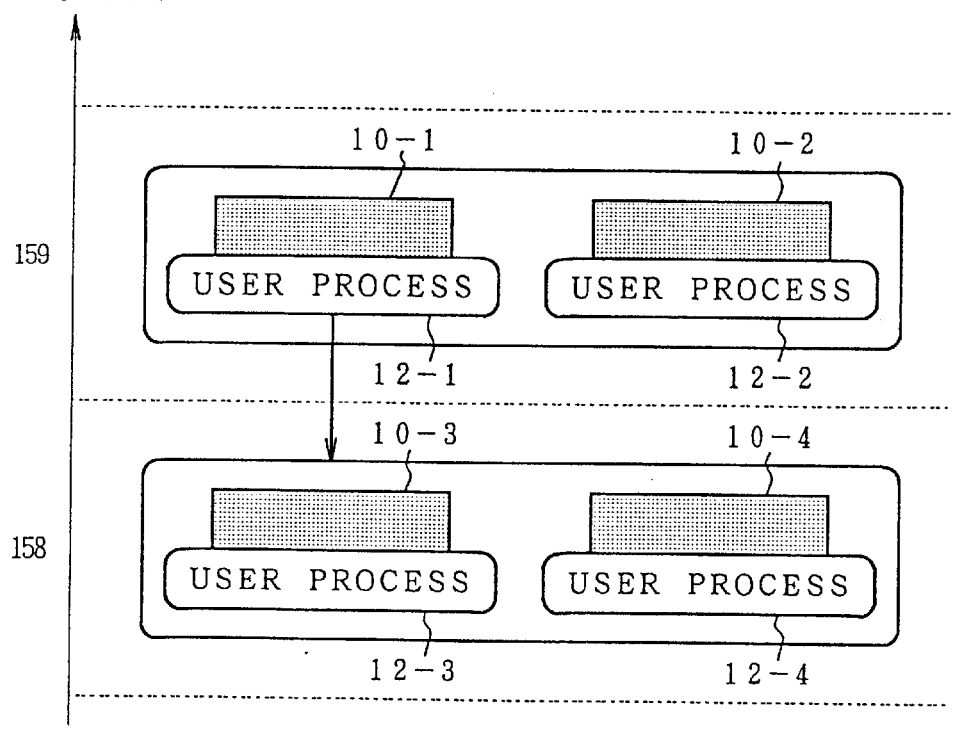
FIG. 4 is a diagram for illustrating the operating environment obtained by applying the hierarchical structure of user-level process schedulers and user processes to the system of FIG. 2.

FIG. 4 illustrates still another example of the operating environment obtained by applying the hierarchical (scheduling) structure of the user-level process schedulers and the user processes to a computer system. A characteristic aspect of this example resides in that the hierarchical scheduling structure is applied to the example of FIG. 2. Namely, the user-level process schedulers 10-1 and 10-2 respectively linked to the user processes 12-1 and 12-2, which operate at the priority of 159 of the real time (scheduling) class, as libraries provide the user-level process schedulers 10-3 and 10-4 respectively linked to the user processes 12-3 and 12-4, which operate at the priority of 158, as libraries. Namely, the user-level process schedulers 10-1 and 10-2 perform the scheduling of the user processes 12-1 and 12-2, respectively, at the priority of 159 correspondingly to a first layer. Further, the user-level process schedulers 10-3 and 10-4 perform the scheduling of the user processes 12-3 and 12-4 in accordance with the scheduling disciplines of the user processes 12-1 and 12-2, respectively, at the priority of 158 correspondingly to a second layer.

Figure 5:
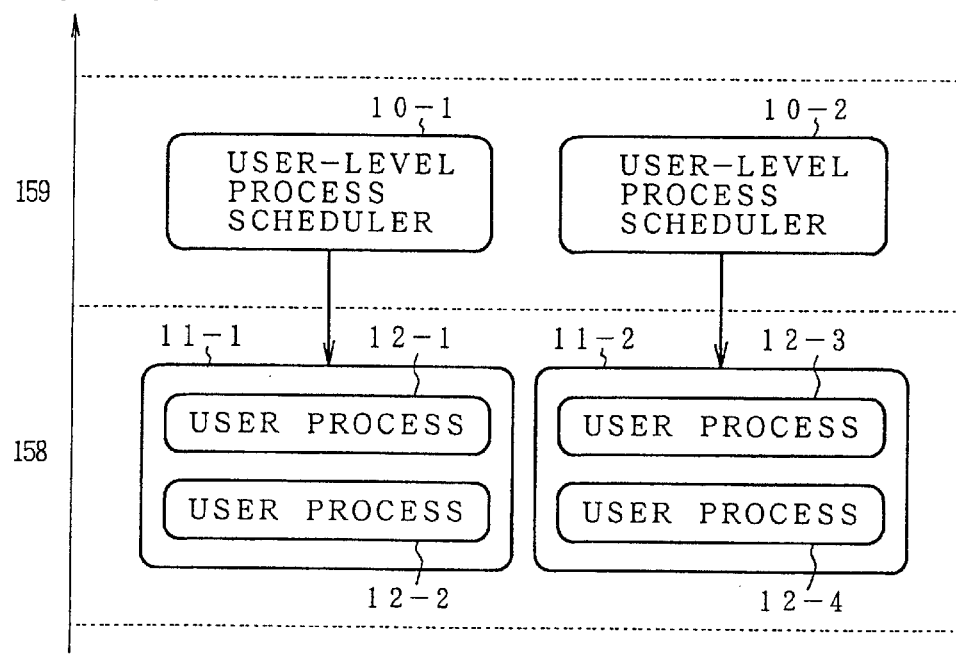
FIG. 5 is a diagram for illustrating the operating environment obtained by providing two user-level process schedulers correspondingly to a same priority.

FIG. 5 illustrates yet another example of (the operating environment of) a user-level process scheduler of the present invention. A characteristic aspect of this example resides in that there are provided a plurality of systems (namely, a plurality of schedulers, each of which is equivalent to the example of the user-level process scheduler of FIG. 1) correspondingly to the real time class. Namely, there are provided two user-level process schedulers 10-1 and 10-2 which operate at the priority of 159 of the real time class. Moreover, a group of the user processes 12-1 and 12-2 and another group of the user processes 12-3 and 12-4 (incidentally, the user processes 12-1 to 12-4 operate at the priority of 158) are respectively provided as user process groups 11-1 and 11-2 which are objects of the scheduling. In the case of this example, the user-level process scheduler 10-1 performs the scheduling of the user processes 12-1 and 12-2. Further, the user-level process scheduler 10-2 performs the scheduling of the user processes 12-3 and 12-4. Needless to say, FIG. 5 illustrates the case that there are two user-level process schedulers 10-1 and 10-2 in the operating system. However, if necessary, there can be provided user-level process schedulers of an arbitrary number.

Functions and Operations of User-level Process Schedulers

Figure 6:
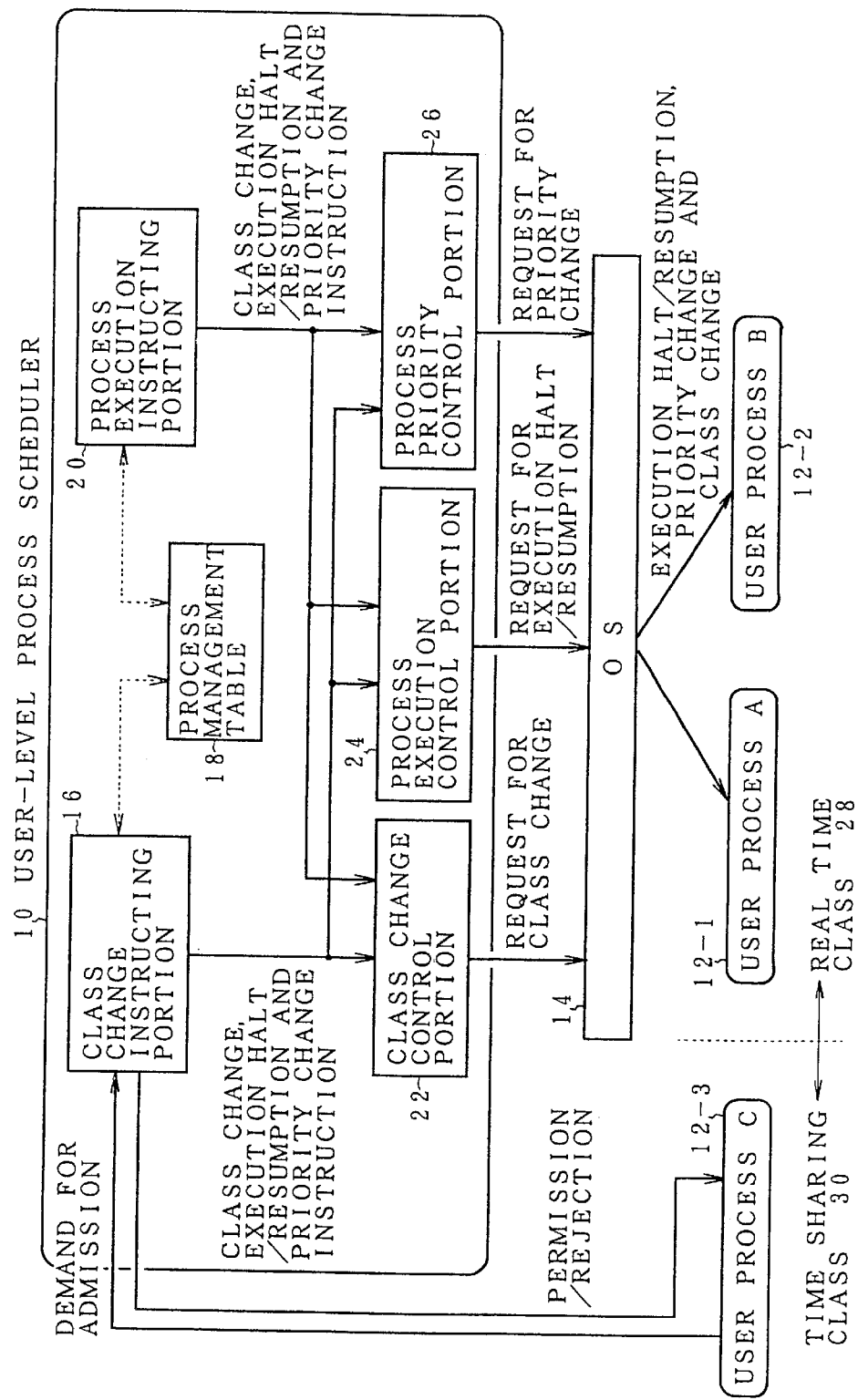
FIG. 6 is a diagram for illustrating the user-level process scheduler of FIG. 1 in detail.

Next, the functions and operations of the user-level process scheduler provided according to the present invention, which is applied in the example of FIG. 1, will be described hereinbelow. FIG. 6 illustrates the user-level process scheduler 10, which operates at the priority of 159, namely, at the first priority of the real time class, in detail. The user-level process scheduler 10 consists of a class change instructing portion 16, a process management table 18, a process execution instructing portion 20, a class change control portion 22, a process execution control portion 24 and a process priority control portion 26. The class change instructing portion 16 receives a demand for admission, which is sent from a user-process 12-3 operating in a scheduling class other than the real time class 28 in which the user-level process scheduler 10 operates, namely, in, for example, the time sharing class 30. Then, the class change instructing portion 16 refers to the process management table 18 and decides to permit or reject the received demand in accordance with the predetermined conditions. When permitting the admission, the class change instructing portion 16 instructs the class change control portion 22 to change the scheduling class from the time sharing class 30 to the real time class 28 and further posts the permission for the admission to the user process 12-3. The condition or requirement of the permission for the admission is, for instance, a total CPU time required by the group of the user processes which are managed by using the process management table 18.

The user process 12-3 specifies necessary CPU time, simultaneously with the demand for admission. If a sum of the specified CPU time and the total CPU time required by the user processes managed by the current process management table 18 is less than the prescribed or predetermined time, the admission is permitted. Conversely, if exceeds, the demand for admission is rejected.

Figures 7, 8:
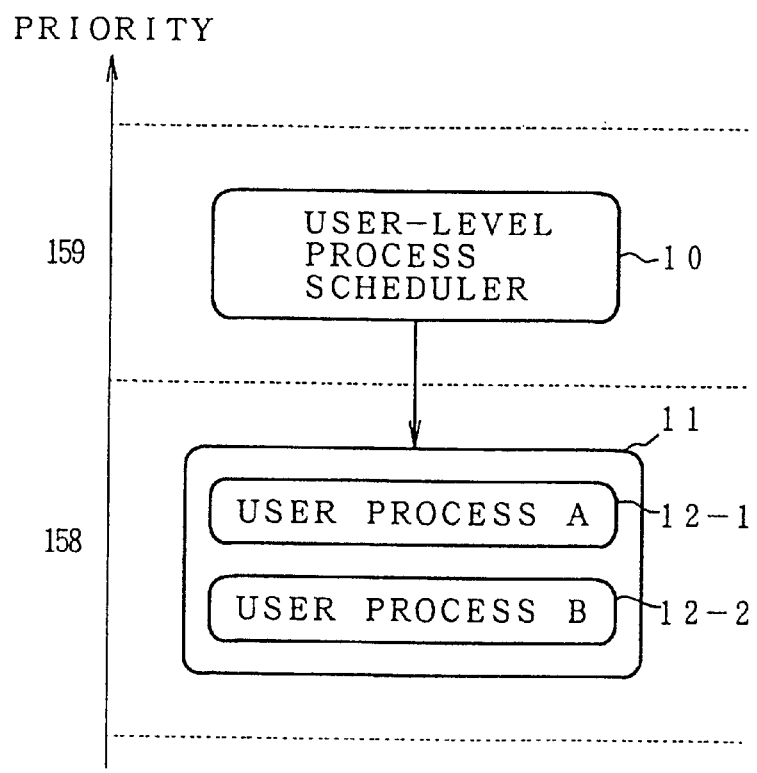
FIG. 7 is a diagram for illustrating the process management table of FIG. 6.
FIG. 8 is a diagram for illustrating an operation of changing the state of user processes by executing and suspending the user processes.

Here at, in the process management table 18, a process identifier is registered and, for example, if a user process having being put into a ready state is executed at regular periods, a CPU utilization time in a period is also registered, as shown in FIG. 7. If a CPU utilization (ratio) is, for instance, 100 percent, the CPU utilization time in one period is set at 100 milliseconds (ms). Here, let A, B and C denote process identifiers corresponding to the user processes 12-1, 12-2 and 12-3 of FIG. 6, respectively. In the case of this example, when the user process C 12-3 makes a demand for admission, the process identifiers A and B, which correspond to the user processes 12-1 and 12-2 having been put into a ready state, and the CPU utilization time periods in a cycle (or period), namely, 50 ms and 20 ms, which respectively correspond to these user processes, have already been registered in the process management table 18. If the user process 12-3 having the process identifier C makes a demand for admission in this state, the CPU utilization time 10 ms is also specified simultaneously therewith. Thus, 80 ms is required or obtained as a sum of the CPU utilization time periods required by the processes. The ratio of this sum to the total CPU utilization time is 80 percent, so that the demand for admission is permitted. Consequently, the process identifier C and the corresponding CPU utilization time of 10 ms are registered in the process management table 18, as illustrated in this figure.

Referring again to FIG. 6, the process execution instructing portion 20 refers to the process management table 18 and further determines what process is executed next time, and how long the next process is executed. Then, the process execution instructing portion 20 gives instructions for class change to the class change control portion 22. Namely, the process execution instructing portion 20 sends the class change control portion 22 an instruction for changing the scheduling class between the time sharing class 30 and the real time class 28. Moreover, the process execution instructing portion 20 gives the process execution control portion 24 instructions for executing, suspending (or halting) or resuming the process. Furthermore, the process execution instruction portion 20 sends the process priority control portion 26 instructions for changing the priority among priorities of 159 to 100 established correspondingly to the real time class 28. The class change control portion 22 requests the operating system 14 to change the class of the designated user process according to the instructions for class change, which are sent from the class change instructing portion 16 or from the process execution instructing portion 20. By this class change request, the operating system 14 carries out the change of the class between the real time class 28, which is the fixed-priority scheduling class, and the other scheduling class, namely, the time sharing class 30. The process execution control portion 24 requests the operating system 14 to perform, suspend (or halt) or resume the execution of the designated user process according to the instructions sent from the class change instructing portion 16 or from the process execution instructing portion 20. Further, the process priority control portion 26 requests the operating system 14 to change the priority belonging to the real time class, which is a fixed priority, according to the instructions sent from the class change instructing portion 16 or from the process execution instructing portion 20. The class change control portion 22, the process execution control portion 24 and the process priority control portion 26 provided in the user-level process scheduler 10 operate separately from one another in response to instructions sent at that time from the class change instructing portion 16 or from the process execution instructing portion 20, and further perform the change of the scheduling of the user processes. Thus, regarding these three control portions 22, 24 and 26, the (scheduling) change control operations will be described hereunder.

FIG. 8 illustrates an example of an operation of changing the state of user processes by executing and suspending the user processes. A characteristic aspect of this example resides in that the user-level process scheduler controls the execution of the user processes by changing the states of the user processes by the use of a signal (handling) function provided by the operating system 14. The user-level process scheduler 10, whose priority is 159, has the user processes 12-1 and 12-2, which have the process identifiers A and B, in a user portion 11 as the objects of the scheduling. The change of the states of the user processes 12-1 and 12-2 into ready states can be realized by using SIGCONT, which is represented by a (UNIX) signal provided by the signal function of the operating system 14, as an argument, and by further issuing the kill system call. Moreover, the change of the states of the user processes 12-1 and 12-2 into suspended states can be realized by using SIGSTOP, which is represented by another signal provided by the signal function of the operating system 14, as an argument, and by further issuing the kill system call. For example, when the user-level process scheduler 10 changes the states of the user processes 12-1 and 12-2, which respectively have the process identifiers A and B, into a ready state and a suspended state, respectively, only the user process 12-1 can be thus performed or executed.

Figure 9:
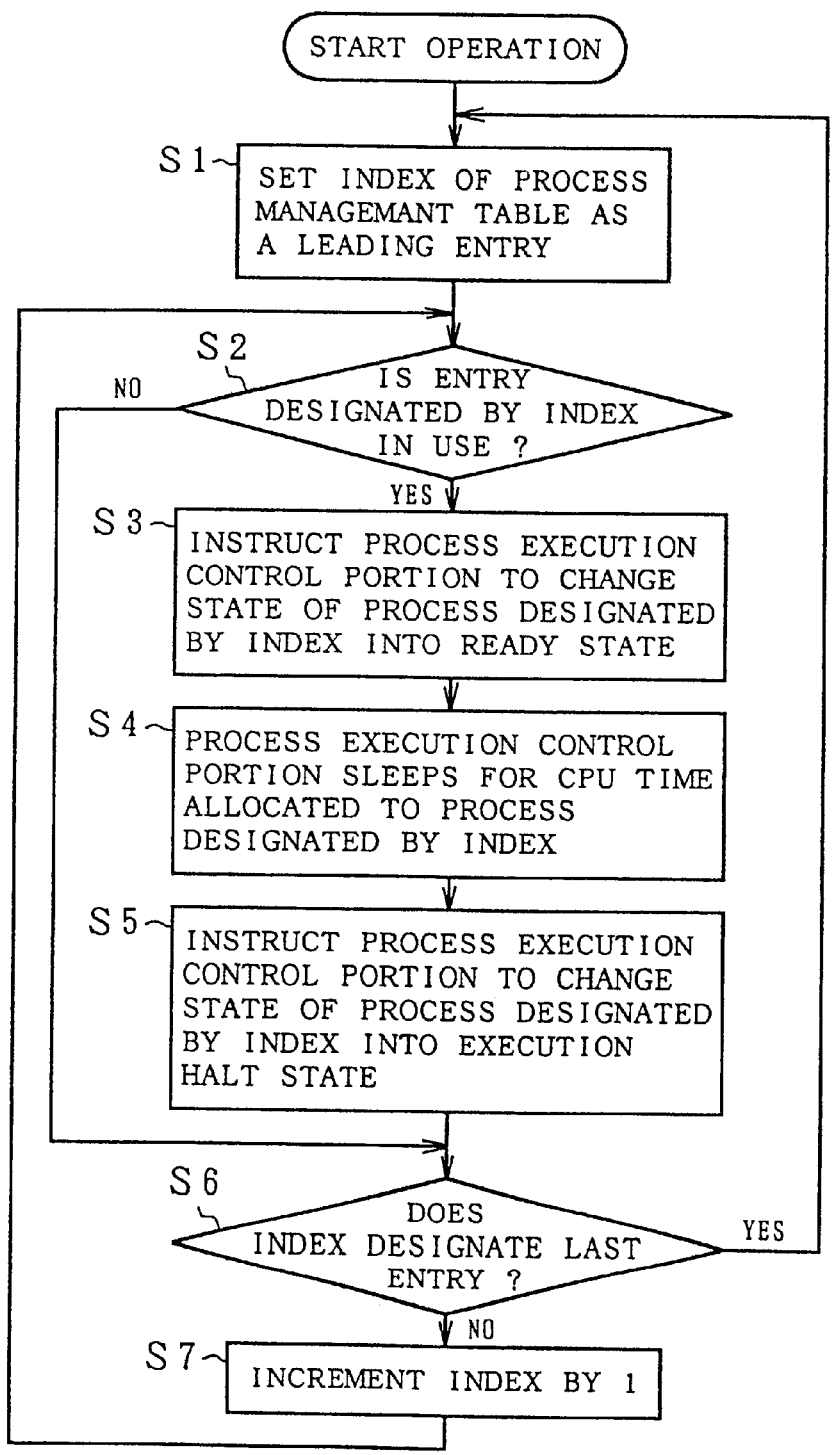
FIG. 9 is a flowchart of execution and suspension operations performed by the process execution control portion of FIG. 6.

Further, the flowchart of FIG. 9 illustrates a processing operation of the process execution control portion 24 in accordance with an execution instruction sent from the process execution instructing portion 20 of FIG. 6. When receiving, for example, the kill system call using SIGCONT represented by a signal from the operating system 14, the process execution instructing portion 20 first employs an index of the process management table 18 as a leading entry, in step S1. Subsequently, in step S2, the process execution instructing portion 20 checks whether or not the entry indicated by the index is currently in use (or being registered). If in use, the process execution instructing portion 20 instructs the process execution control portion 24 in step S3 to change the state of the user process, which has the process identifier designated by the index, into a ready state. For example, in the case of employing the process management table of FIG. 7, the process execution instructing portion 20 instructs the process execution control portion 24 to execute the execution of the user process A designated by the first index thereof. Thus, the process execution control portion 24 sleeps in step S4 for a lapse of 50 ms, which is the CPU utilization time of the user process A, to thereby execute the user process A for the period of 50 ms. Subsequently, in step S5, the process execution instructing portion 20 requests the process execution control portion 24 to change the state of the user process A, which is designated by the first index thereof, into a suspended (or halted) state. At this request of the process execution instructing portion 20, the operating system 14 stops the execution of the user process A. When the operation or execution of the user process A designated by the first index is completed in steps S3 and S4, it is checked in step S6 whether or not the index designates the last entry. If not, the index is incremented by 1 in step S7. Then, this program (namely, this operation of the process execution control portion 24) returns to step S2. Then, the user process B corresponding to the entry designated by the next index (namely, the second index) is performed or executed similarly. Thereafter, if it is judged in step S6 that this index designates the last entry, the program returns again to step S1. Then, the processing is iteratively performed correspondingly to the indexes from the first (or leading) index of the process management table 18. Consequently, the scheduling can be achieved in such a manner that a plurality of user processes, which are registered in the process management table 18 and are in a ready or executable state, are executed within the set CPU (utilization) time.

Figure 10:
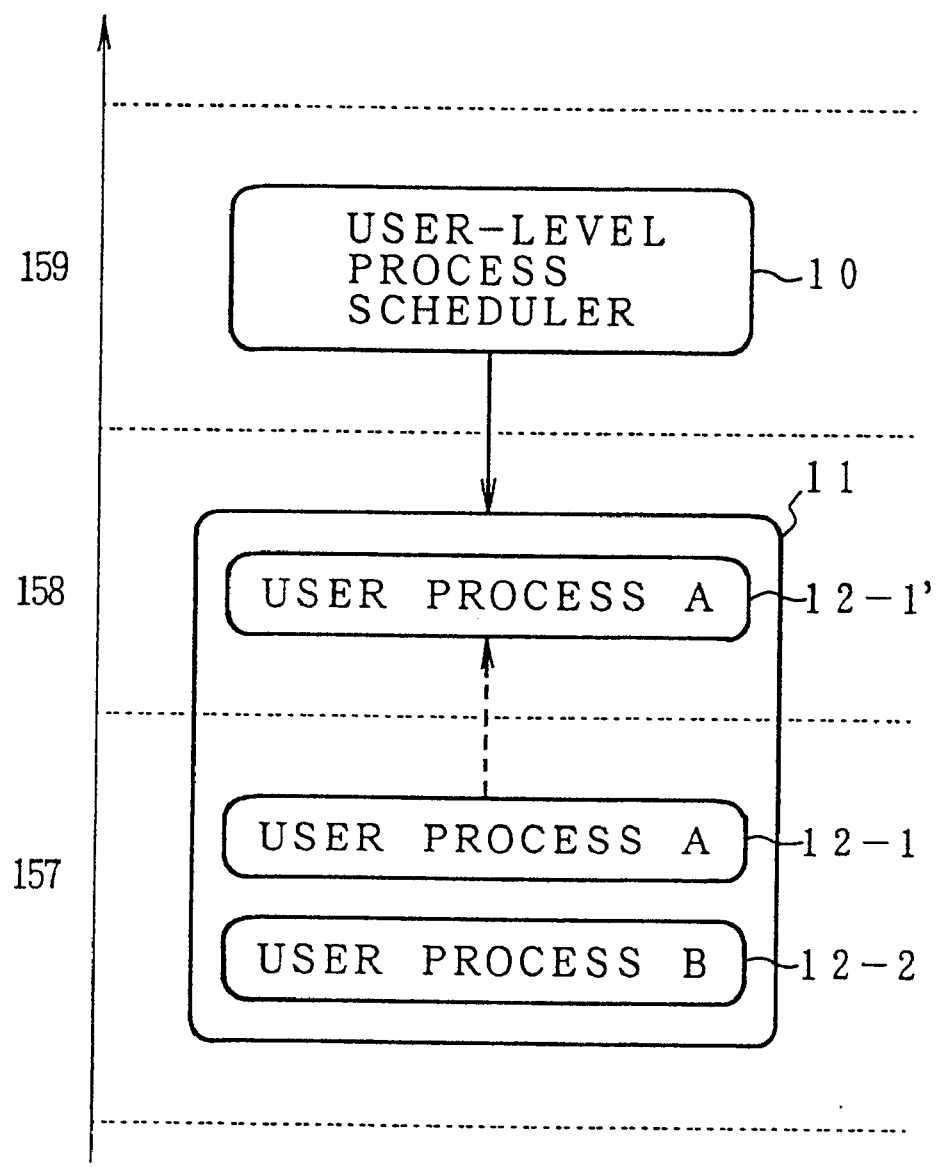
FIG. 10 is a diagram for illustrating an operation of changing the priority of a user process.

FIG. 10 illustrates an example of the operation of changing a user process by the process priority control portion 26 of FIG. 6. A characteristic aspect of this example resides in that the user-level process scheduler can control the execution of the user process by changing the priority of the user process in the response to the priocntl system call provided by the operating system 14. Further, only the user process 12-1' corresponding to the process identifier A can be executed by changing the priority of the user process 12-1, whose priority has been 157, by means of the user-level process scheduler 10 into 158, as illustrated in FIG. 10.

Figure 11:
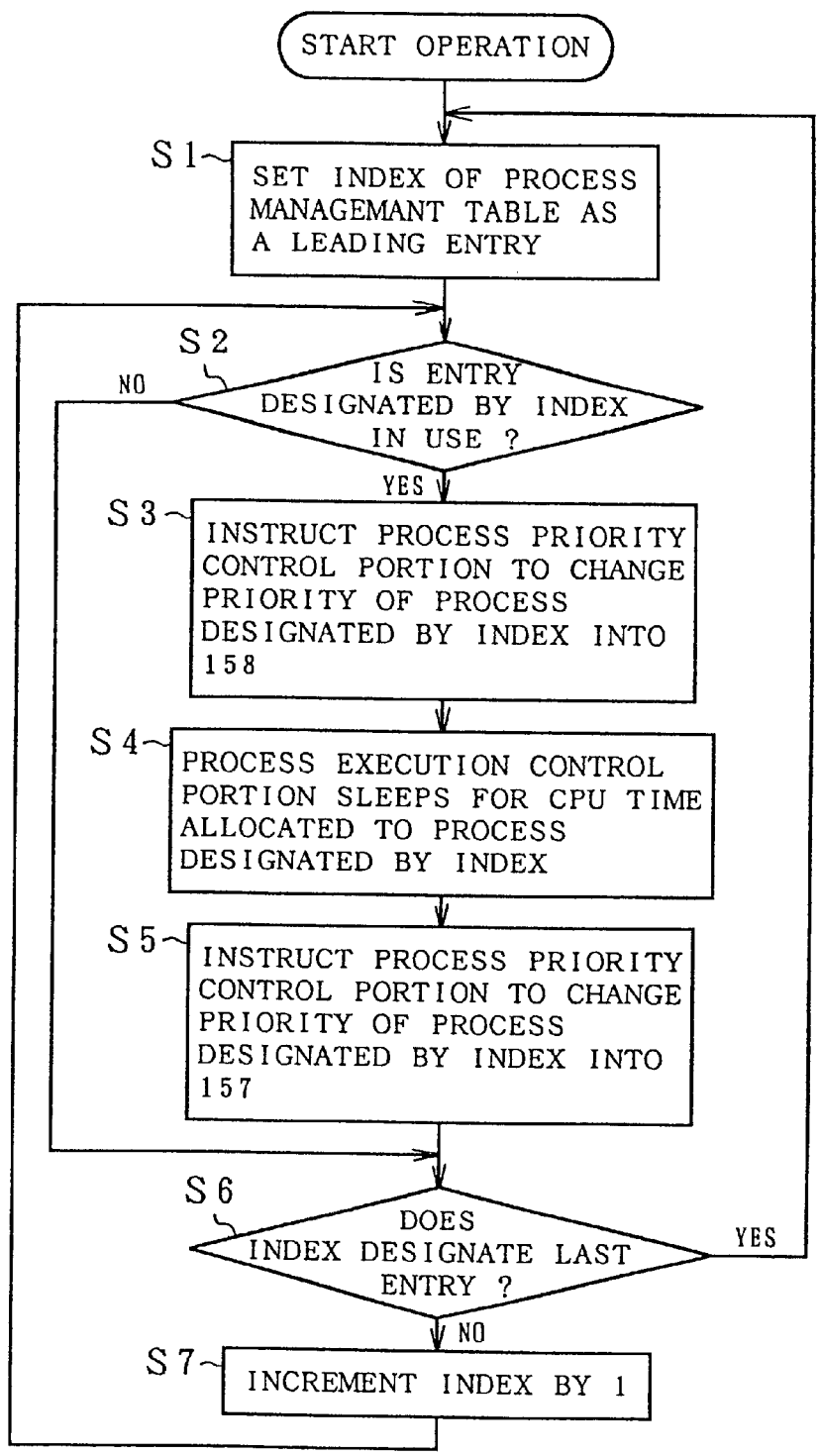
FIG. 11 its a flowchart of execution and suspension operations performed by the process priority control portion of FIG. 6.

The flowchart of FIG. 11 illustrates a processing operation of the process priority control portion 26 in accordance with an execution instruction sent from the process execution instructing portion 20 of FIG. 6. First, for the change of the priority, the process priority execution instructing portion 20 sets an index of the process management table 18 as a leading entry, in step S11. Then, in step S12, the process execution instructing portion 20 checks whether or not the entry indicated by the index is currently in use (or being registered). If in use, the process execution instructing portion 20 instructs the process priority control portion 26 in step S13 to change the priority of the user process designated by the index into 158. Next, the process execution control portion 24 sleeps in step S14 for a lapse of the CPU utilization time of the user process designated by the index to thereby execute the user process C for the specified time. Subsequently, in step S15, the process execution instructing portion 20 requests the process priority control portion 26 to change the priority of the user process designated by the index into 157. Incidentally, in step S15, for the purpose of securely halting or suspending the user process, the process execution instructing portion 20 may be adapted to request the process priority control portion 26 to change the priority of this user process into 100 which is the lowest priority belonging to the real time class. Subsequently, it is checked in step S16 whether or not the index designates the last entry. If not, the index is incremented by 1 in step S17. Then, this program (or operation) returns to step S12 again. Then, the execution and suspension of the processing in steps S13 to S15 are iteratively performed on the user process registered at an entry (point) designated by the next index of the process management table.

Figure 12:
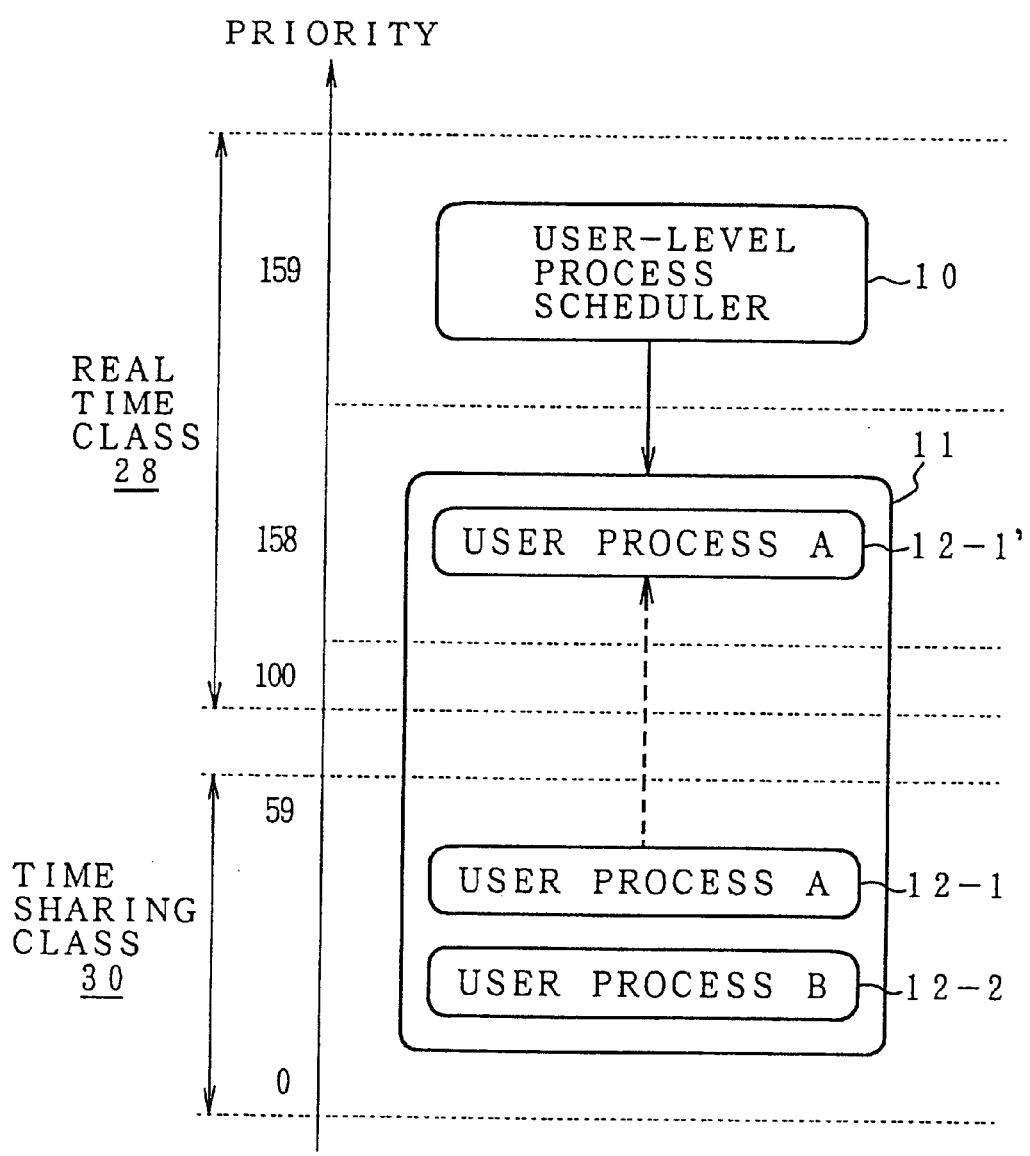
FIG. 12 is a diagram for illustrating an operation of changing the class of a user process.

FIG. 12 illustrates an example of the operation of changing the user process by means of the class change control portion 22 according to a class change instruction sent from the process execution instructing portion 20 of FIG. 6. The operating system Solaris 2.4, on which the scheduler of the present invention is implemented, has the time sharing class 30, in which the time sharing scheduling is performed, in addition to the fixed-priority real time class 28. In the case of employing the time sharing class 30, the operating system 14 dynamically changes the priority of the user process as follows. Here, the time sharing class 30 has the priorities of 59 to 0.

I. In the case that a user process spends certain CPU time, the priority of the user process is lowered or reduced by a certain value.

II. If the certain CPU time is not allocated to a user process despite the executability of the user process, the priority of the user process is increased or heightened by a certain value.

III. In the case that a user process voluntarily releases the allocated CPU (namely, the user process sleeps), the priority of the user process is increased or heightened by a certain value after awaked.

Further, the user-level process scheduler of the present invention can control the execution of a user process by changing the (scheduling) class between such a time sharing class 30 and the real time class 28, in which the user-level process scheduler of the present invention operates, in response to the priocntl system call provided by the operating system 14. For example, only the user process 12-1' corresponding to the process identifier A can be made to operate by changing the class of the user process 12-1, which corresponds to the process identifier A and has operated in the time sharing class, into the real time class 28 (incidentally, in the case of this example, the priority thereof becomes 158) by means of the user-level process scheduler 10, as illustrated in FIG. 12.

Figure 13:
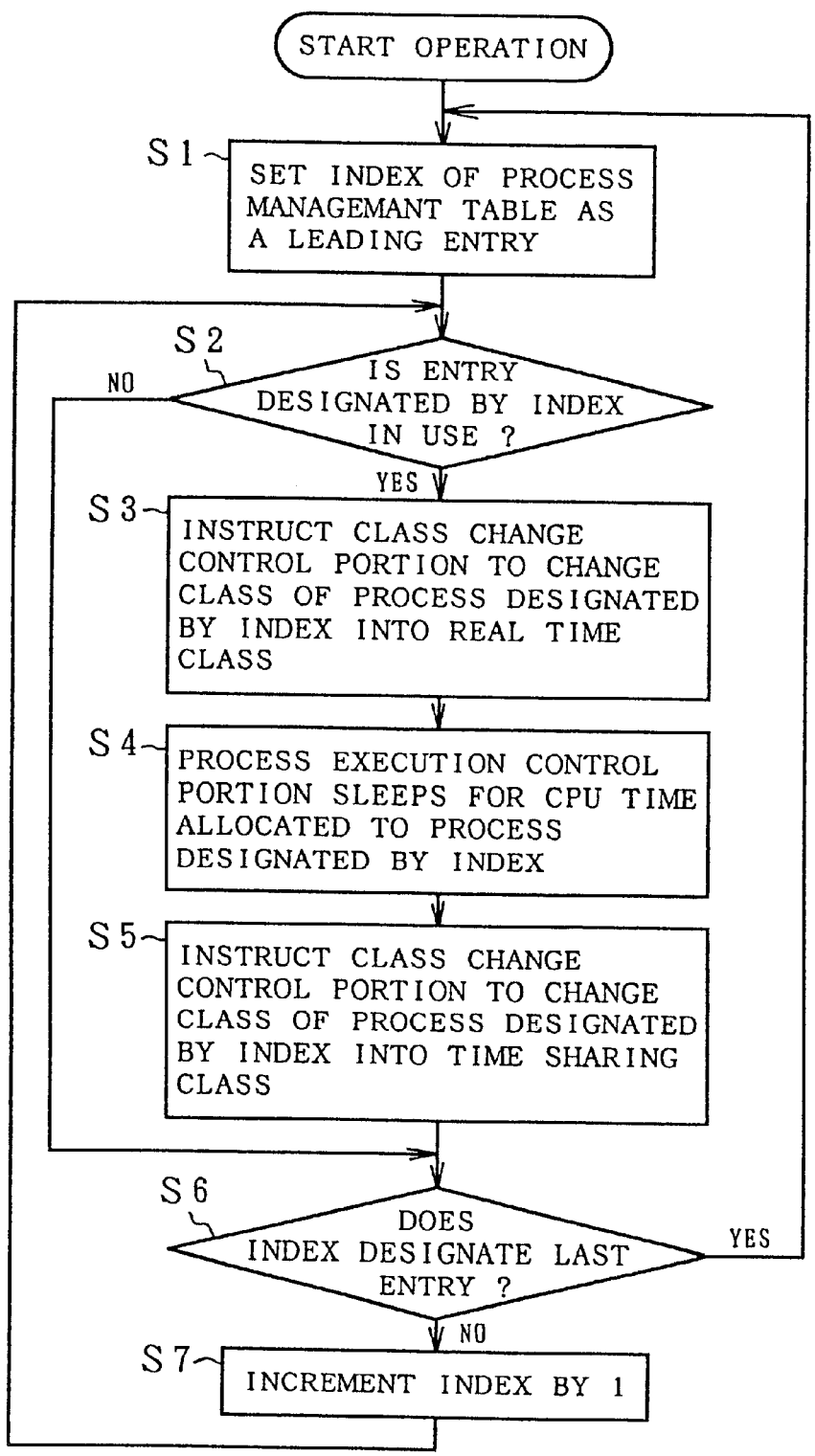
FIG. 13 is a flowchart for illustrating execution and suspension operations performed by the class change control portion of FIG. 6.

The flowchart of FIG. 13 illustrates an operation of changing a user process when the process execution instructing portion 20 of FIG. 6 gives an instruction for the class change to the class change control portion 22 of FIG. 6. When a class change instruction is given to the process execution instructing portion 20 in response to the priocntl system call provided by the operating system, an index of the process management table 18 is first set as a leading entry in step S21. Then, it is checked in step S22 whether or not the entry designated by the index is in use. If in use, the process execution instructing portion 20 instructs the class change instructing portion 22 in step S23 to change the class of the user process designated by the index into the real time class 28. Consequently, the operating system 14 changes the class and priority of the objective user process into the real time class and the corresponding priority of 158, respectively. Next, the process execution instructing portion 20 sleeps in step S24 for a lapse of the CPU utilization time of the user process designated by the index to thereby cause the user process to operate for the specified time. Then, in step S25, the process execution instructing portion 20 instructs the class change control portion 22 to change the class of the user process designated by the index into the time sharing class 28. Thus the execution of this user process is halted or suspended. Subsequently, it is checked in step S26 whether or not the index designates the last entry. If not, the index is incremented by 1 in step S27. Then, this program returns to step S22. Thereafter, similar operation is performed on the next user process iteratively.

Admission and Exit of User Process

The admission of a user process into the group (or pool) of objects of the scheduling (namely, user processes to be scheduled) by the user-level process scheduler 10 provided in the scheduling space of the real time class 28 of FIG. 6 is performed when receiving a demand (or request) for admission, which is sent from a user process that is present in the time sharing class 30. Further, the exit (or withdrawal) of a user process from such a group is handled when receiving a demand (or request) for exit, which is sent from the user process. A demand for admission and a demand for exit are made on the class change instructing portion 16. Then, the class change instructing portion 16 can perform three different kinds of processing of the demands by sending an instruction to one of the class change control portion 22, the process execution control portion 24 and the process priority control portion 26.

Figure 14:
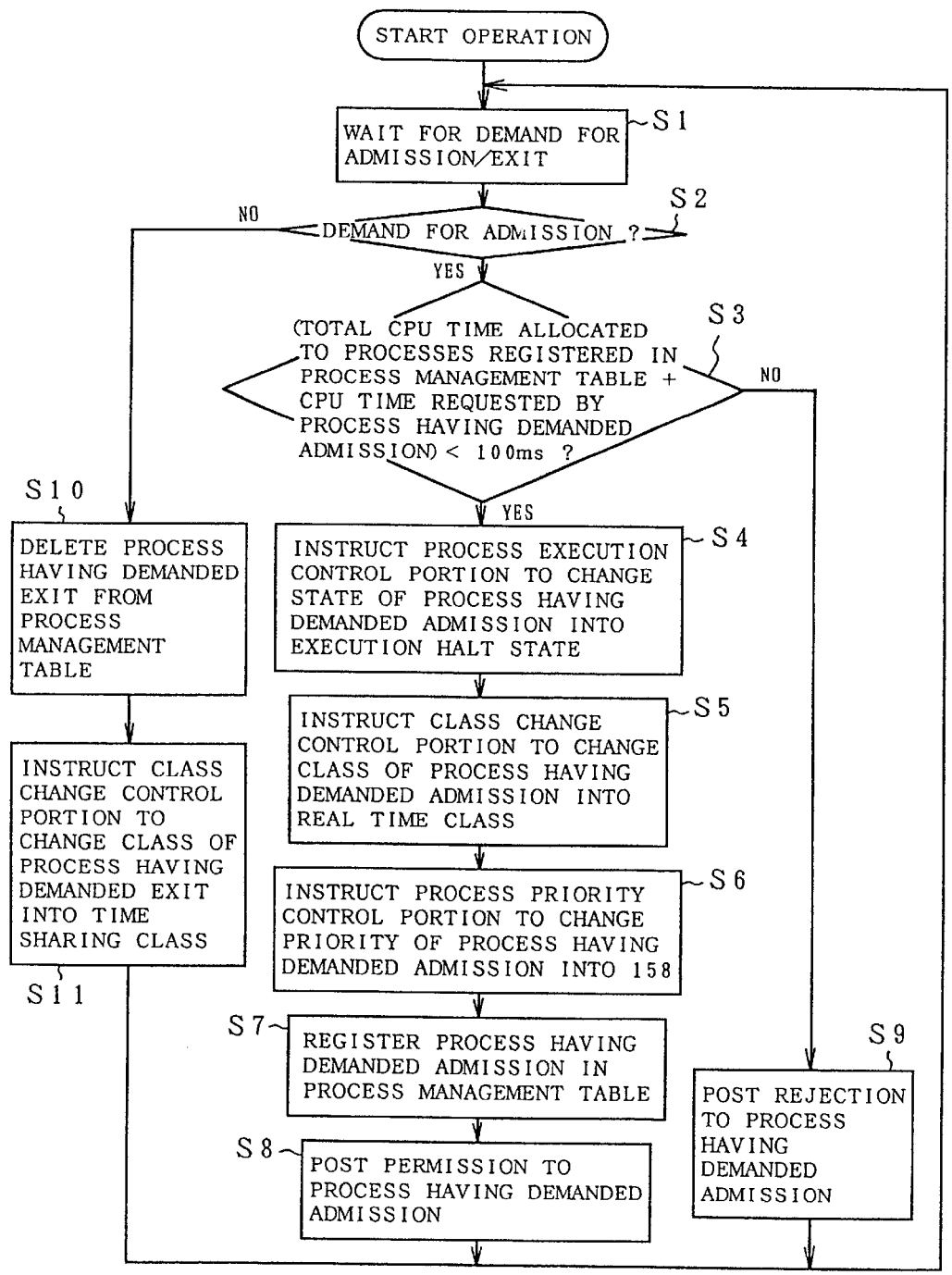
FIG. 14 is a flowchart for illustrating admission and exit operations of user processes, which are performed by using a request for execution halt (or for suspension) of FIG. 6.

The flowchart of FIG. 14 illustrates the admission and exit of user processes to be performed by utilizing a request for execution, a request for halt (or suspension) and a request for resumption, which are made on the process execution control portion 24. First, in step S31, the user-level scheduler waits for a demand (or request) for admission (or exit) issued from a user process which belongs to the time sharing class. When receiving a demand, it is checked in step S32 whether or not the received demand is a demand for admission. Here, it is assumed that a demand for admission is made by the user process 12-3 which corresponds to the process identifier C and belongs to the time sharing class. In the case of this example, when making the demand for admission, the user process 12-3 specifies the CPU utilization time in a period (namely, CPU time, during which the user process by itself utilizes the CPU, within a period (or cycle)), for example, 10 ms. As a result of receiving the demand for admission, this program advances to step S33 whereupon the class change instructing portion 16 checks whether a sum of the total CPU utilization time of the user processes registered in the process management table 18 and the CPU utilization time required by the user process having made the demand for admission is shorter than a predetermined time, namely, 100 ms. Here, it is assumed that the user processes 12-1 and 12-2 respectively corresponding to the process identifiers A and B are registered in the management table 18 as illustrated in FIG. 7 and that the CPU (utilization) time periods in a cycle (or period), which respectively correspond to the user processes 12-1 and 12-2, are 50 ms and 20 ms. Thus, a sum of the total CPU utilization time in a cycle (or period), which corresponds to the user processes 12-1 and 12-2, and the CPU utilization time of 10 ms corresponding to the user process 12-3 having made the demand for admission becomes 80 ms and is, therefore, shorter than the predetermined time, namely, 100 ms. Consequently, the admission of this user process is allowed, so that this program advances to step S34. Then, in step S34, the class change instructing portion 16 instructs the process execution control portion 24 to change the state of the user process 12-3, which has made the demand for admission, into the (execution) suspended (or halted) state. Further, the process execution control portion 24 requests the operating system 14 to put the user process 12-3 into the suspended (or halted) state. Subsequently, in step S35, the class change instructing portion 16 instructs the class change control portion 28 to change the class, to which the user process 12-3 having made the demand for admission belongs, into the real time class. Then, in step S36, the class change instructing portion 16 instructs the process priority control portion 26 to change the priority of the user process 12-3 into 158. Thereby, the priority of the user process 12-3, the admission of which is allowed, is set at 158 which is a priority belonging to the real time class in which the user-level process scheduler 10 operates. Subsequently, in step S37, the user process 12-3 having made the demand for admission is registered-in the process management table 18, as indicated by the process identifier C and the corresponding CPU time 10 ms in FIG. 7. Finally, in step S35, the permission for admission is posted to the user process 12-3 having made the demand for admission. In contrast, in the case that the sum of the total CPU utilization time in a cycle (or period), which corresponds to the user processes 12-1 and 12-2, and the CPU utilization time required by the user process 12-3 having made the demand for admission exceeds the predetermined time, namely, 100 ms, this program advances to step S39 whereupon the rejection of the admission is posted to the user process 12-3 having made the demand for admission. Further, when a demand for exit from the group (or pool) is made from a user process, this program advances from step S32 to step S40 whereupon the user process having made the demand for exit is deleted from the process management table 18. Next, in step S41, the class change instructing portion 16 instructs the class change control portion 22 to change the class, to which the user process has made the demand for exit belongs, into the time sharing class 30.

Figure 15:
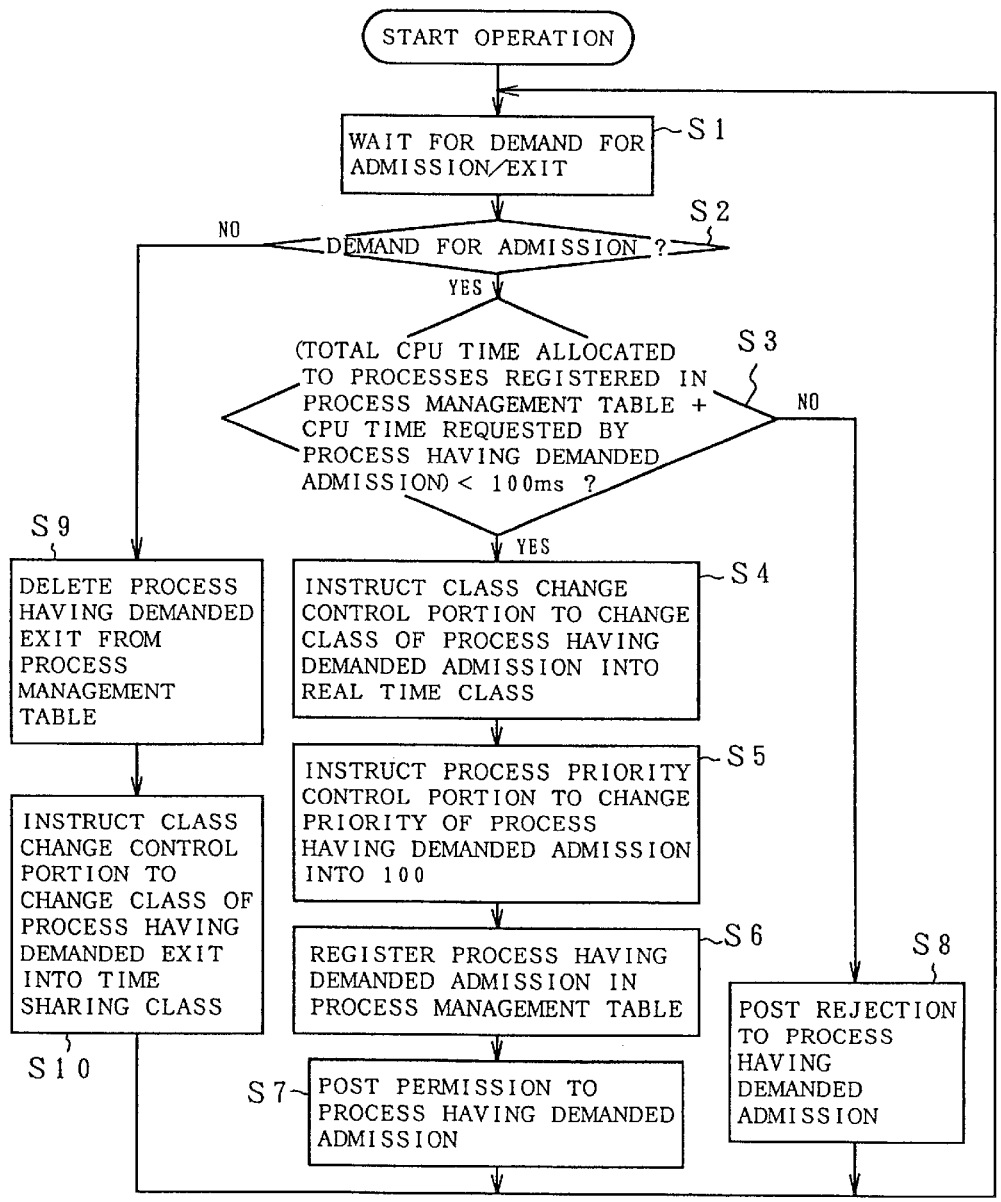
FIG. 15 is a flowchart for illustrating admission and exit operations of user processes, which are performed by using a request for priority change of FIG. 6.

The flowchart of FIG. 15 illustrates the admission and exit operations of a user processes, which are performed by utilizing the priority change control operation of the process priority control portion 26 in response to a demand for admission sent from the user process. First, in step S51, the user-level scheduler waits for a demand (or request) for admission or exit issued from a user process. When receiving a demand, it is checked in step S52 whether or not the received demand is a demand for admission. If the demand for admission, if it is checked in step S53 whether or not a sum of the total CPU utilization time in a cycle, which corresponds to the user processes having already been registered in the process management table 18, and the CPU utilization time corresponding to the user process having made the demand for admission is shorter than 100 ms. If shorter, the admission of this user process is allowed, so that this program advances to step S54 whereupon the class change instructing portion 16 instructs the class change control portion 22 to change the class, to which the user process having made the demand for admission belongs, into the real time class 28. Subsequently, in step S55, the class change instructing portion 16 instructs the priority change control portion 26 to change the priority of the user process, which has made the demand for admission, into 100. Then, in step S56, the user process 12-3 having made the demand for admission is registered in the process management table 18. Subsequently, in step S57, the permission for admission is posted to the user process having made the demand for admission. In contrast, in the case that the sum of the total CPU utilization time in a cycle (or period), which corresponds to the registered user processes, and the CPU utilization time required by the user process having made the demand for admission is equal to or longer than 100 ms, the rejection of the admission is posted in step S57 to the user process having made the demand for admission. Further, if it is judged in step S52 that a demand for exit from the group (or pool) is made from a user process, the user process having made the demand for exit is deleted in step S59 from the process management table 18. Next, in step S60, the class change instructing portion 16 instructs the class change control portion 22 to change the class, to which the user process having made the demand for exit belongs, into the time sharing class 30.

Figure 16:
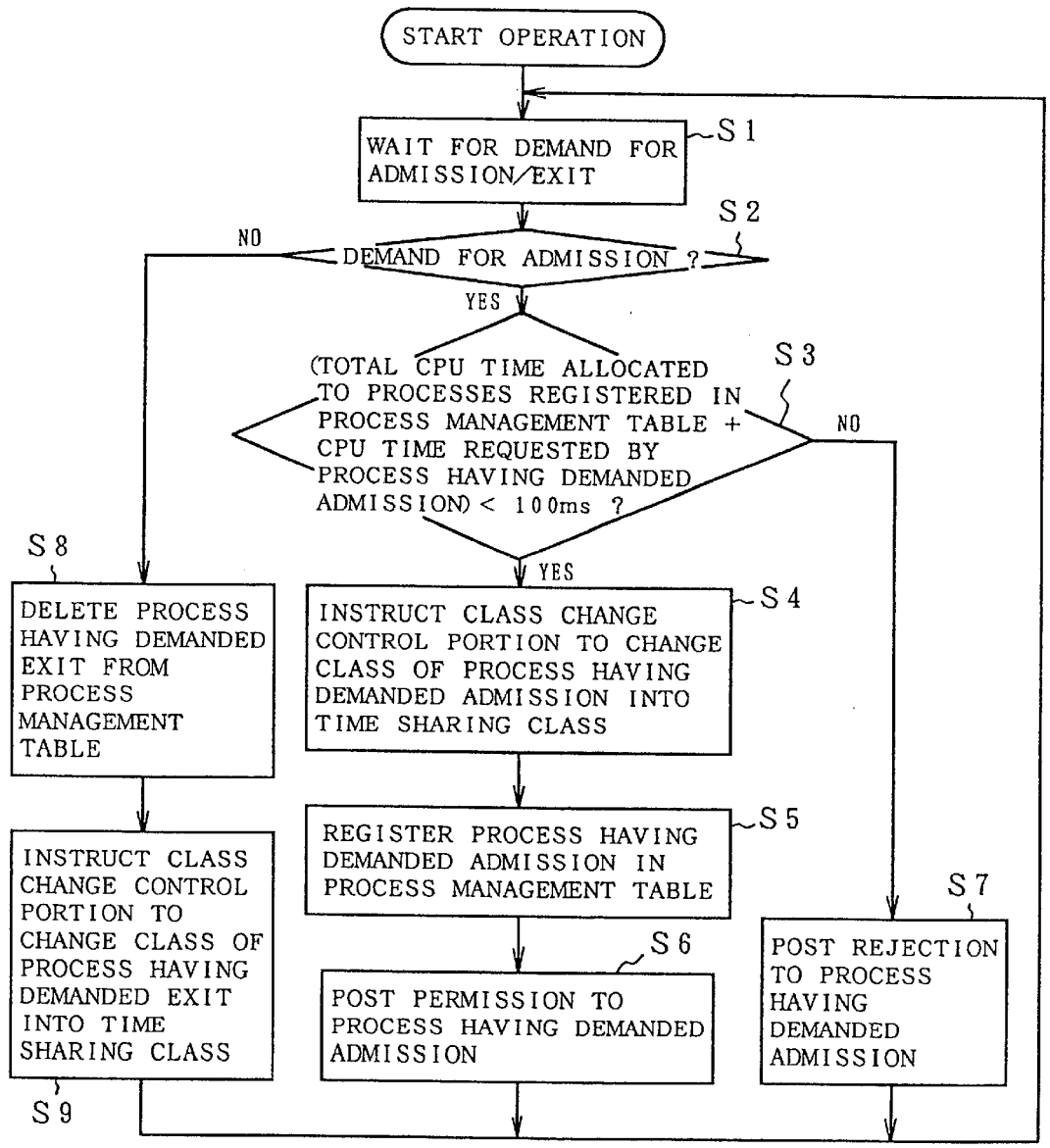
FIG. 16 is a flowchart for illustrating admission and exit operations of user processes, which are performed by using a request for class change of FIG. 6.

The flowchart of FIG. 16 illustrates a processing operation to be performed by utilizing the control function of the class change control portion 22 of FIG. 6 in response to a demand for admission or exit, which is sent from a user process. First, in step S61, the user-level scheduler waits for a demand (or request) for admission or exit issued from a user process. When receiving a demand, it is checked in step S62 whether or not the received demand is a demand for admission. If the demand for admission, if it is checked in step S63 whether or not a sum of the total CPU utilization time in a cycle, which corresponds to the user processes having already been registered in the process management table 18, and the CPU utilization time corresponding to the user process having made the demand for admission is shorter than 100 ms. If shorter, the admission of this user process is allowed, so that this program advances to step S64 whereupon the class change instructing portion 16 instructs the class change control portion 22 to change the class, to which the user process having made the demand for admission belongs, into the time sharing class 30. Subsequently, in step S65, the user process having made the demand for admission is registered in the process management table 18. Then, in step S66, the permission for admission is posted to the user process having made the demand for admission. In this case, first, the user process having made the demand for admission is put into the time sharing class 30. Thereafter, when executing this user process, the class, to which this user process belongs, is changed into the real time class 30 in which the user-level process scheduler of the present invention performs the scheduling. In contrast, in the case that the sum of the total CPU utilization time in a cycle (or period), which corresponds to the registered user processes, and the CPU utilization time required by the user process having made the demand for admission is equal to or longer than 100 ms, the rejection of the admission is posted in step S67 to the user process having made the demand for admission. Further, if it is judged in step S62 that a demand for exit from the group (or pool) is made from a user process, the user process having made the demand for exit is deleted in step S68 from the process management table 18. Next, in step S69, the class change instructing portion 16 instructs the class change control portion 22 to change the class, to which the user process having made the demand for exit belongs, into the time sharing class 30.

Figure 17:
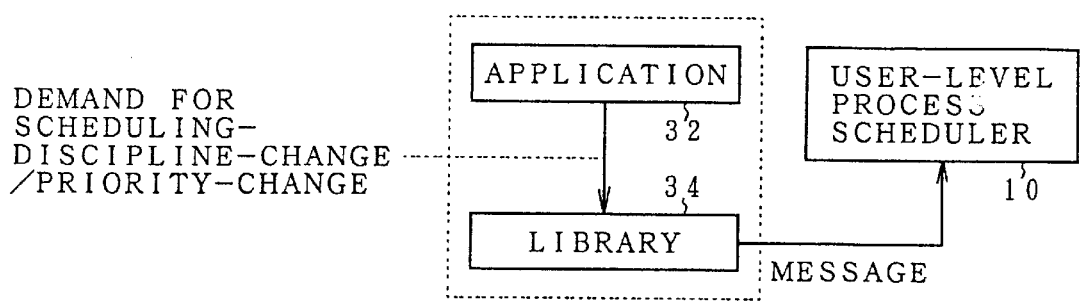
FIG. 17 is a diagram for illustrating a demand for a scheduling change by using a library.

FIG. 17 illustrates an example of an operation of posting a demand for a scheduling change or a priority change to a user-level process scheduler by using a library. In a library 34 linked to the application program 32, information designating the scheduling method or class of the user-level process scheduler 10 (namely, indicating whether the real time class or the time sharing class is employed) and a function used to change the priorities of user processes are prepared or stored. In the case that the contents of this library 34 is recalled or read, the change of the scheduling or the priority of a user process is posted to the user-level process scheduler 10 by sending such a message thereto as a change (or alteration) notice. When receiving the change notice represented by the message, the user-level process scheduler 10 judges whether or not such a change is possible. If possible, the scheduling method or the priority is changed in response to the priocntl system call provided by the operating system. In contrast, if impossible, the user-level process scheduler 10 posts to the library 34 to that effect. Then, the library 34 posts to the application program 32 to that effect.

Figure 18:
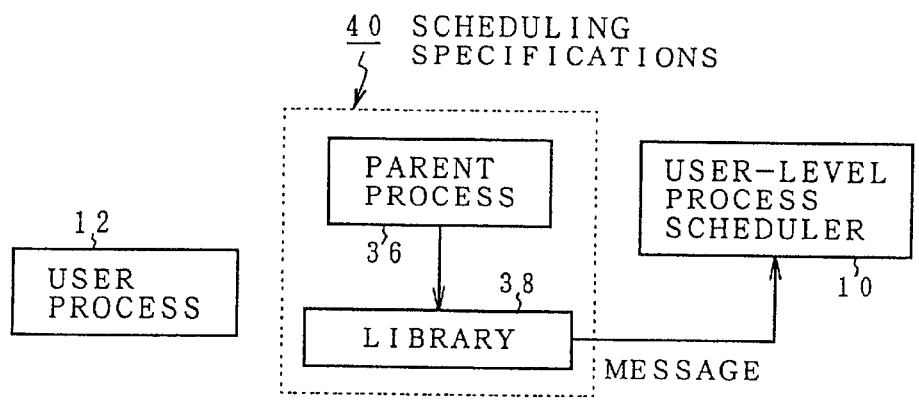
FIG. 18 is a diagram for illustrating a demand for a scheduling change based on the scheduling specifications of a library.

FIG. 18 illustrates another example of an operation of posting a demand for a scheduling change or a priority change to a user-level process scheduler by using a library. In the case of this example, a parent process 36, which is operative to create a user process 12, makes a demand (or request) for changing the scheduling method or the priority by sending a message according to the predetermined scheduling specifications to the user-level process scheduler 10 through a library 38 to be linked. The scheduling specifications 40, which are created by the parent process 36, describes a relative start time and a relative finish time with respect to a operation start time of the user process 12 and further describes the scheduling method used between the relative start time and the relative finish time, as illustrated in, for example, FIG. 19. Thus, when receiving a message according to such scheduling specifications 40 from the library 38, the user-level process scheduler 10 performs the scheduling of the user process 12 in compliance with the scheduling specifications 40.

Figures 19, 20:
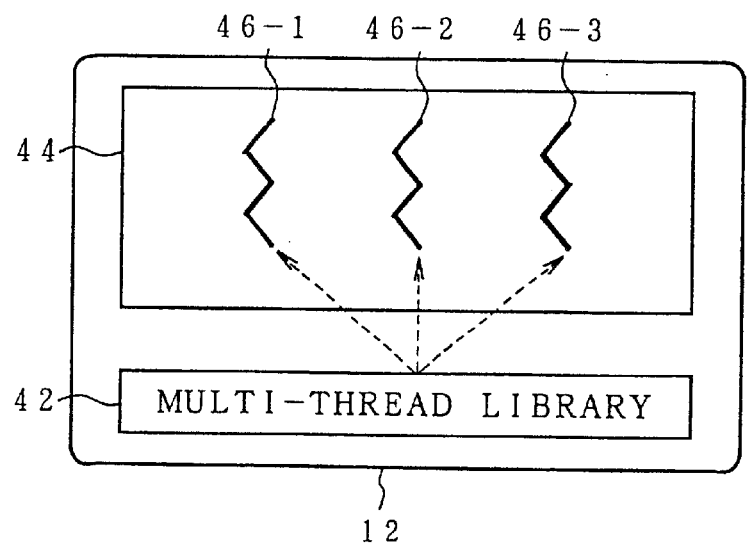
FIG. 19 is a diagram for illustrating the scheduling specifications of FIG. 18.
FIG. 20 is a diagram for illustrating a user process linked to a multi-thread library.

FIG. 20 illustrates the internal structure of a user process to be scheduled by the user-level process scheduler of the present invention. As illustrated in this figure, the case of the user process 12, which is an object of the scheduling by the user-level process scheduler of the present invention, is linked with a multi-thread library 42. In a thread group 44, three threads 46-1, 46-2 and 46-3 are scheduled by the multi-thread library 42.

Guarantee on User Process's Utilization of CPU

Figure 21:
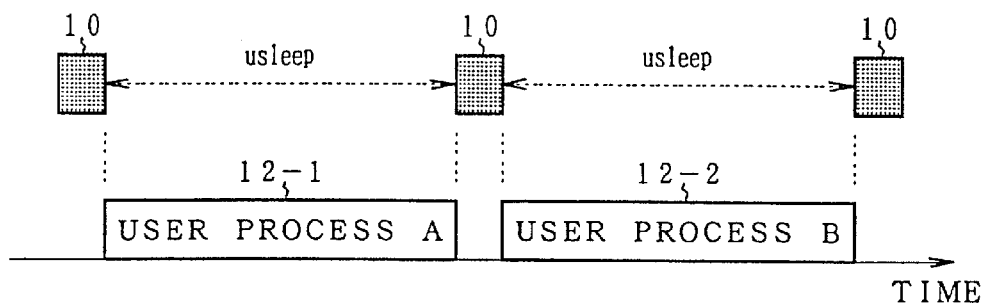
FIG. 21 is a diagram for illustrating an operation of causing only one user process in a certain time in the operating environment of FIG. 1.

The user-level process scheduler 10 having the control functions illustrated in FIG. 6 can perform such a scheduling that can ensure the utilization of the CPU by allocating the CPU to user processes to be scheduled, namely, user processes registered in the process management table 18 at uniform rates. FIG. 21 is a diagram for illustrating the manner of an operation of limiting the object of the CPU assignment to only one user process. The user-level process scheduler 10 generates an instruction to change the state of the user process 12-1, which corresponds to the process identifier A and is an object to be executed, into a ready state. Particularly, this state change (or alteration) instruction is issued by the process execution instructing portion 20 and is one of an execution/suspension instruction to be given to the process execution control portion 24, a class change instruction to be given to the class change control portion 22 and a priority change instruction to be given to the process priority control portion 26. In the case of the instruction sent from the process execution instructing portion 20 to the process execution control portion 24, only the user process 12-1 is put into a ready state in response to the kill system call, whereas the other user processes are put into a suspended (or halted) state. Further, in the case of the priority change instruction sent from the process execution instructing portion 20 to the process priority control portion 26, only the user process 12-1 is set in such a manner as to have the priority of 158 in response to the priocntl system call, while the other user processes are set in such a way as to have the priority of 157. Moreover, in the case of the class change instruction sent from the process execution instructing portion 20 to the class change control portion 22, only the class, to which the user process 12-1 belongs, is changed into the real time class 28 in response to the priocntl system call, while the classes, to which the other user processes belong, respectively, are changed into the time sharing class 30.

When the execution of the aforementioned instruction of changing the user process is finished, the user-level process scheduler 10 sleeps for a lapse of the time, during which the user process 12-1 is executed, namely, for the allocated CPU time which is obtained by referring to the process management table 18, in response to the usleep system call. Thereby, the user-level process scheduler 10 causes the user-process 12-1 to operate, as illustrated in FIG. 21. Furthermore, this processing is similarly performed on the user process 12-2 corresponding to the next process identifier B. In addition, this processing is repeatedly performed on a plurality of user processes which are registered in the process management table 18 and are in the ready state.

Figure 22:
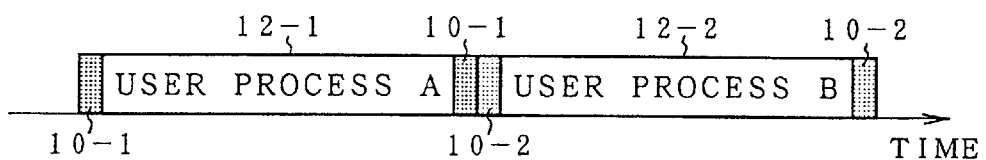
FIG. 22 is a diagram for illustrating an operation of causing only one user process in a certain time in the operating environment of FIG. 2.

FIG. 22 illustrates operations of the two user-level process schedulers 10-1 and 10-2 linked to the user processes 12-1 and 12-2 of FIG. 2, respectively. Similarly as in the case of FIG. 21, the user-level process scheduler 10-1 linked to the user process 12-1 corresponding to the process identifier A performs one of the following operations:

I. Execution and suspension in response to the kill system call;

II. Changing of the priority thereof in response to the priocntl system call; and III. Changing of the class, to which this user process belongs, in response to the priocntl system call.

Next, the user-level process scheduler 10-1 linked to the user process 12-1 sleeps in response to the usleep system call for the corresponding CPU utilization time recorded in the process management table. Thereby, the user process 12-1 is caused to operate as shown in FIG. 22. This processing is similarly performed on the user process 12-2 corresponding to the process identifier B.

Figure 23:
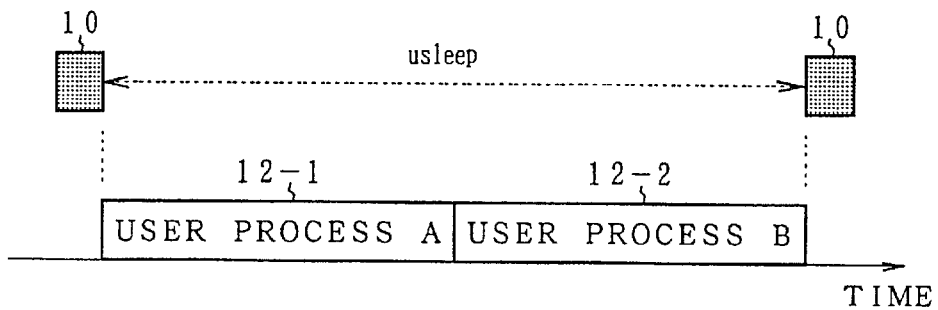
FIG. 23 is a diagram for illustrating an operation in the case that a plurality of user processes, to which a CPU is allocated, are executed.

FIG. 23 illustrates an operation in the case that a plurality of user processes, to which the CPU is allocated, are executed. The user-level process scheduler 10 causes the two user-processes 12-1 and 12-2 to operate. First, the user-level process scheduler 10 performs one of the following operations:

I. Execution and suspension in response to the kill system call;

II. Changing of the priority thereof in response to the priocntl system call; and III. Changing of the class, to which this user process belongs, in response to the priocntl system call.

Thereby, the user-level process scheduler 10 puts the two user processes 12-1 and 12-2 into the ready state. Subsequently, -the user-level process scheduler 10 sleeps in response to the usleep system call for a certain period of time determined from a total of the CPU time periods respectively allocated to the user-processes 12-1 and 12-2, which are obtained from the process management table. Thus, the two user processes 12-1 and 12-2 are caused to operate as illustrated in this figure. In this case, it is determined on the basis of the states of the user processes 12-1 and 12-2 how these user processes operate in a period of time in which the user-level process scheduler 10 sleeps. For example, if the user-process 12-1 releases the CPU, the user process 12-2 does not operate. Conversely, if the user process 12-1 immediately releases the CPU, the user process 12-2 comes to operate. Here, the causes of suspension or halt of the user processes 12-1 and 12-2 are, for instance, I/O waiting and the issuance of the sleep system call.

FIGS. 24A and 24B illustrate the case that the user processes of FIG. 23 are executed (or caused to operate) by a multi-processor consisting of a plurality of CPUs are allocated to user processes and thus the user processes are executed. In this case, as illustrated in FIGS. 24A and 24B, the CPUs 48-1 and 48-2 can be allocated to the user processes 12-1 and 12-2, respectively. Consequently, the two user processes 12-1 and 12-2 can be executed simultaneously by the different CPUs 48-1 and 48-2, respectively.

FIG. 25 illustrates an example of how the user-level process scheduler of the present invention can ensure the execution of a plurality of processes within a predetermined constant time T. First, the user-level process scheduler 10 causes the user process 12-1 corresponding to the process identifier A to operate or run for a certain time by performing one of the following operations:

I. Execution and suspension in response to the kill system call;

II. Changing of the priority thereof in response to the priocntl system call; and III. Changing of the class, to which this user process belongs, in response to the priocntl system call.

Thereafter, the user-level process scheduler 10 causes the other user process 12-2, which corresponds to the process identifier B, to operate or run for a certain time by performing one of these three operations similarly.

Figure 26:
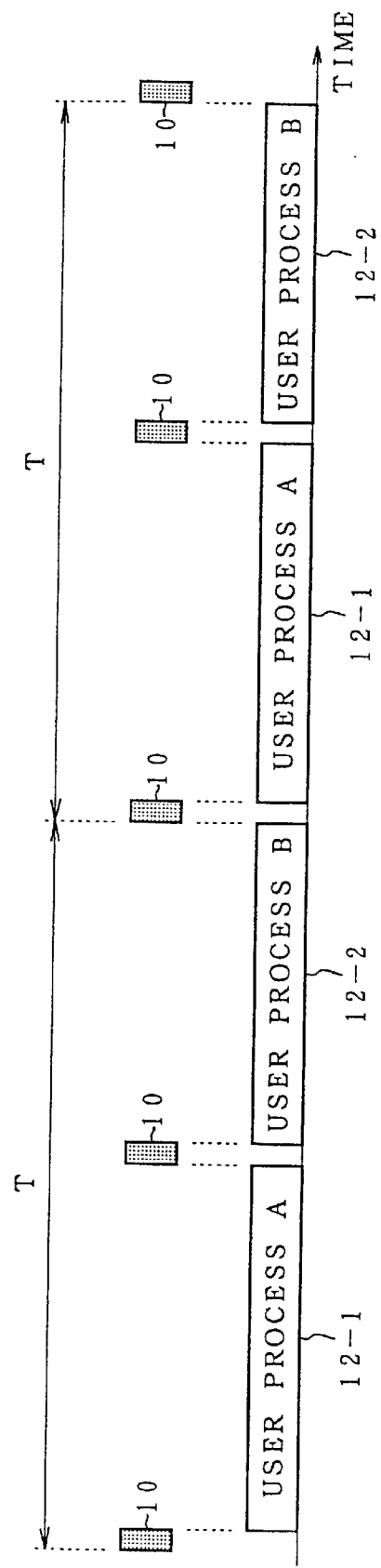
FIG. 26 is a diagram for illustrating the case that a plurality of user processes are executed at constant periods (or intervals)

FIG. 26 is a diagram for illustrating an example of the case that a plurality of processes are put into a ready state and are iteratively executed at constant periods (or intervals). In the case of this example, the two user processes 12-1 and 12-2 are objects of the scheduling. In a constant period T, the user-level process scheduler 10 puts the user process 12-1, which corresponds to the process identifier A, into a ready state by performing one of the following operations:

I. Execution and suspension in response to the kill system call;

II. Changing of the priority thereof in response to the priocntl system call; and III. Changing of the class, to which this user process belongs, in response to the priocntl system call. Thereafter, the user-level process scheduler 10 causes the user process 12-1 to operate for a certain time. Next, the user-level process scheduler 10 causes the other user process 12-2 to operate or run for a certain time in the similar way. This sequence of operations is cyclically repeated. Further, this repetition of the sequence of the operations of the user processes at the regular periods (or intervals) T can be applied to the case that the operating periods of the user processes are equal to one another.

Figure 28:
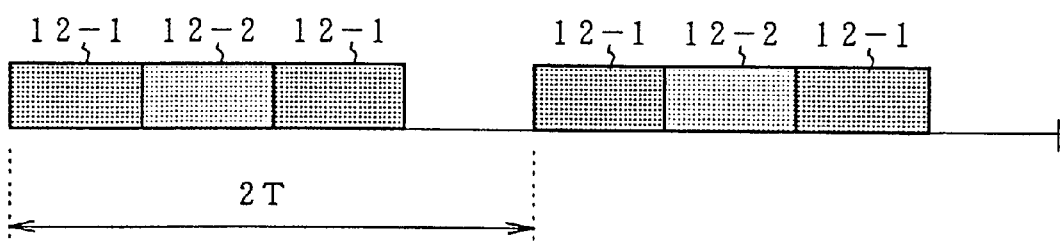
FIG. 28 is a diagram for illustrating the case that the user processes of FIGS. 27A and 27B are executed at constant periods.

FIGS. 27A and 27B illustrate the case that a plurality of user processes which are different in operating periods from one another. First, the user process 12-1 iteratively operates at regular periods T, as illustrated in FIG. 27A. Differently from this, the user process 12-2 iteratively operates at regular periods 2T, each of which is twice the period T, as illustrated in FIG. 27B. In the case that the operating periods of the two user processes 12-1 and 12-2 are different from each other in this manner, the least common multiple of the operating periods (incidentally, in this case, the period 2T) is employed as a scheduling period, as illustrated in FIG. 28. Namely, immediately after the user process 12-1 having the operating period T is executed, the user process 12-2 having the operating period 2T is executed. Subsequently, the user process 12-1 having the operating period T is executed again. Further, the rest of the scheduling period 2T is employed as an idling period. Such a sequence of operations is repeated.

Here, note that in the case of the example of FIG. 26 in which the plurality of the user processes are executed at constant periods T, 100 percent of the CPU time in one period T is used by the user processes. Thus, if another user process, which requires 20 percent of the CPU time in one period T, makes a demand (or request) for admission into the group (or pool) of objects of the scheduling in such an operating environment, this demand is rejected by the user process scheduler 10. In contrast, if an upper limit to the total of the CPU utilization (ratios) allocated to the user processes 12-1 and 12-2 in one period T is 80 percent, a demand for admission, which is made by another user process requiring 20 percent of the CPU tim in one period T, can be accepted. Consequently, this user process can admitted to the group of objects of the scheduling. Thus, the admission control (method), which is a kind of QOS (quality of service) control method, is employed for the operation having a constant period T of FIG. 26. The upper limit of the total of the CPU utilization time of the user process 12-1 and that of the user process 12-2 is 80 percent. Consequently, a demand for admission, which is issued from another additional user process, whose CPU utilization (ratio) is not more than 20 percent, can be efficiently accepted or permitted.

Figure 29:
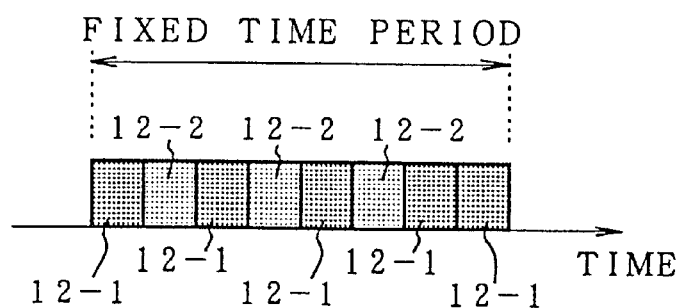
FIG. 29 is a diagram for illustrating the case that a certain time period is divided into a plurality of time slices and thus a plurality of user processes are executed.

FIG. 29 illustrates the manner of an operation to performed by dividing a certain time period into a plurality of time slices, in each of which the CPU is allocated to a user process. Namely, differently from the cases of FIGS. 25 and 26, in which the CPU is continuously allocated to one user process in each of the certain time periods T or in each of regular periods, in the case of FIG. 29, the certain time period (namely, the CPU time) is divided into a plurality of time slices, in each of which the CPU is allocated to one of user processes 12-1, 12-2 and 12-3.

FIG. 30 illustrates the manner of an operation in which constant CPU time is forcibly allocated to user processes which are objects of the scheduling and belong to the time sharing class. As shown in this figure, the user processes 12-1 and 12-2 are present in (namely, belong to) the real time class 28, while the user processes 12-3 and 12-4 are present in the time sharing class 30. In this case, the user-level process scheduler 10 sequentially causes the user processes 12-1 and 12-2, which belong to the real time class, to operate or run for a certain time by performing one of the following operations:

I. Execution and suspension in response to the kill system call;

II. Changing of the priority thereof in response to the priocntl system call; and III. Changing of the class, to which this user process belongs, in response to the priocntl system call. Thereafter, the user-level process scheduler 10 puts the user processes 12-1 and 12-2 into a suspended state. Further, in response to the usleep system call, the CPU is released for a certain time period. Thereby, the CPU is allocated to the time sharing class 30, so that the user processes 12-3 and 12-4 are executed (or caused to operater. In this case, the scheduling of the user processes 12-3 and 12-4 is performed by a time sharing schedular of the operating system Solaris 2.4.

Figure 31A:
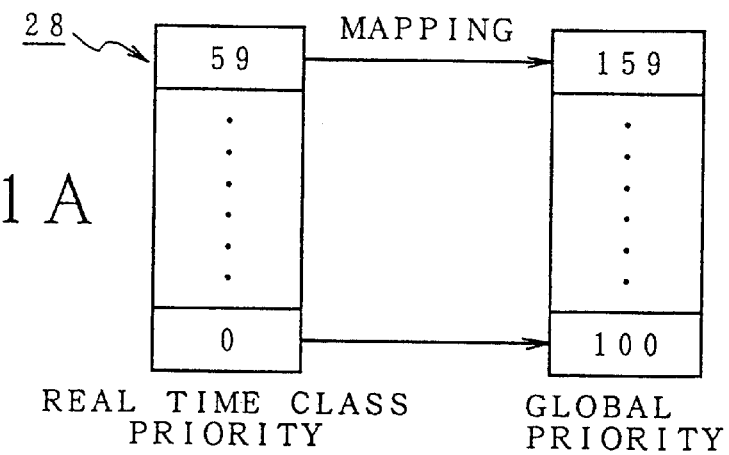
FIGS. 31A to 31C are diagrams for illustrating the mapping of priorities in the cases of the real time class and the time sharing class.
Figure 31B:
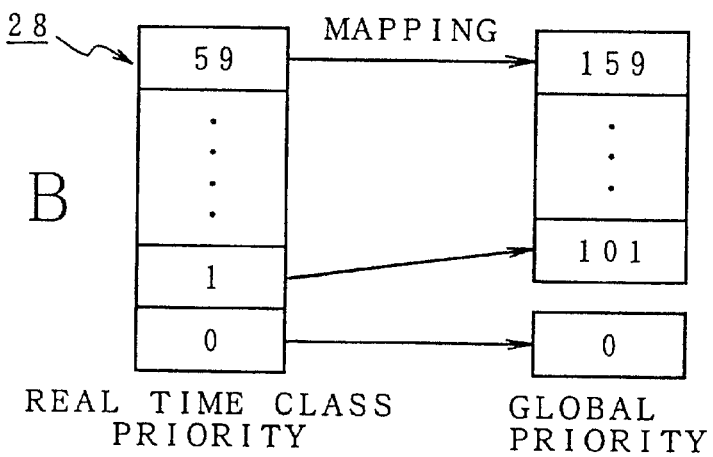
Figure 31C:
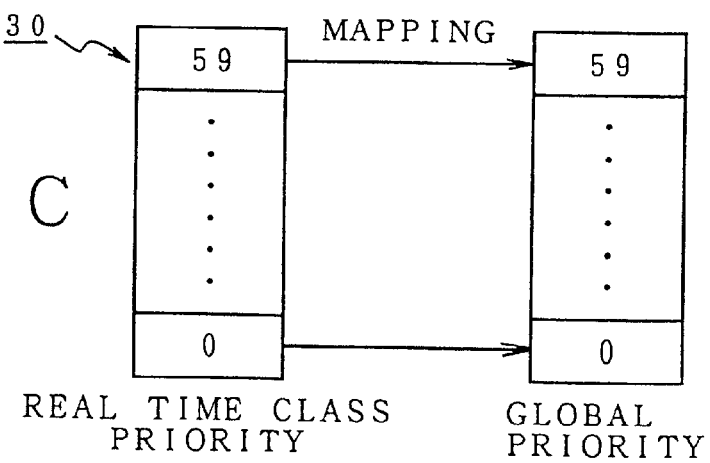

FIGS. 31A to 31C are diagrams for illustrating the mapping that indicates the corresponding relation between the priorities of the real time class (namely, the scheduling space of the user-level process scheduler of the present invention) and global priorities or between the priorities of the time sharing class and global priorities. In the case of the operating system Solaris 2.4 supporting the user-level process scheduler of the present invention, the time sharing class priorities ranging 0 to 59 are mapped onto the global priorities also ranging 0 to 59 as illustrated in FIG. 31C, so that the global priorities are established. Further, regarding the real time class, the time sharing class priorities ranging 0 to 59 are mapped onto the global priorities also ranging 100 to 159 as illustrated in FIG. 31A, so that the global priorities are established. This mapping of the priorities of FIG. 31A is copied onto a file RT-DPTBL to be linked when the operating system is activated. In contrast, in accordance with the present invention, as illustrated in FIG. 31B, the lowest priority of the real time class 28 is made to be equal to the lowest priority (0) of the time sharing class 30, differently from the case of the mapping file of FIG. 31A.

Figure 32:
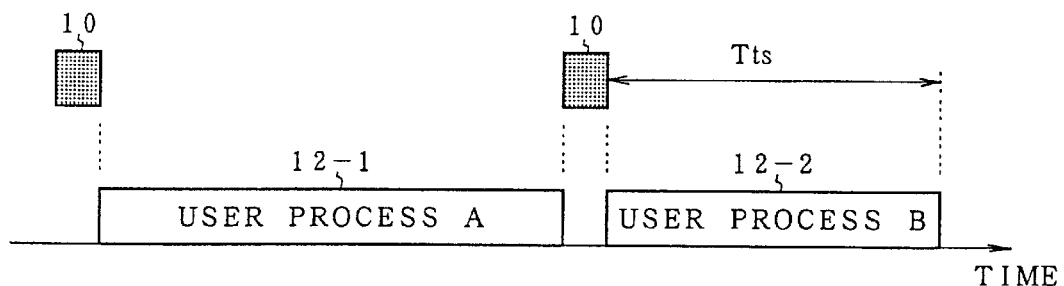
FIG. 32 is a diagram for illustrating an operation (or execution) of a user process which belongs to the real time class and is mapped onto the priority of 0.

In accordance with the mapping of FIG. 31B, the manner of an operation of FIG. 32 is obtained. Further, a certain time period is allocated or established as a time period Tts for a time sharing process by instructing the process priority control portion 26 of FIG. 6 to set the priority of the user process 12-2 at 0. In this case, if there is actually present no executable time sharing process during the time period Tts for the time sharing process, the user process 12-2, which belongs to the real time class 28 and has the lowest priority (0) of FIG. 31B, can be executed (or caused to operate) instead of a user process belonging to the time sharing class. Needless to say, because the user process 12-1 is put into a suspended state at that time, this user process does not run during the user process 12-2 operates (or is executed). Consequently, the user process belonging to the real time class can be efficiently executed (or caused to operate) even if an operating time is allocated to the user process belonging to the time sharing class for a certain time period.

Detection of Blocking of User Process

Figure 33:
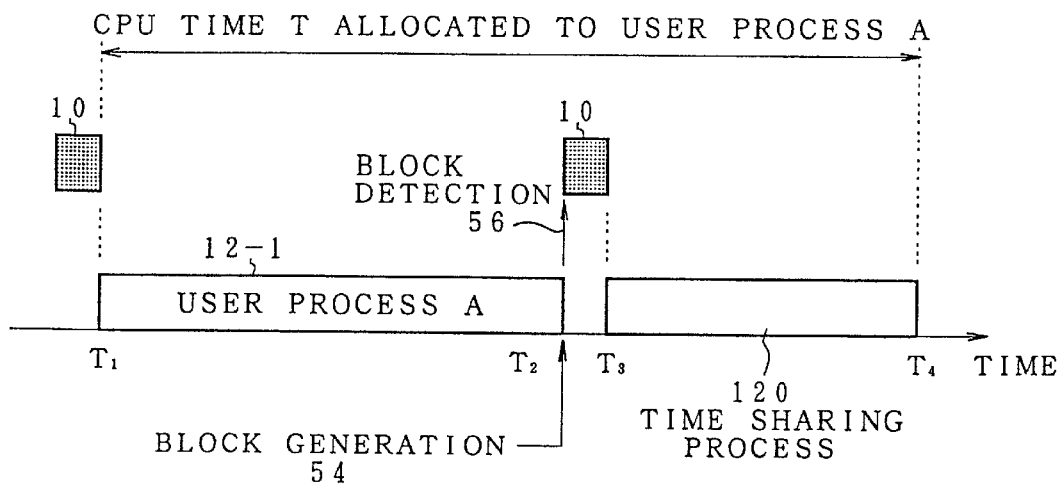
FIG. 33 is a diagram for illustrating an operation at the time when it is detected that a user process is blocked.

FIG. 33 illustrates the case that a blocking occurs when the CPU time T from a moment T1 to another moment T4 is allocated to the user process 12-1 by means of the user-level process scheduler 10. Namely, it is assumed that at the moment T1, the CPU time is allocated to the user process 12-1 and thus this user process starts operating and that a blocking 54 occurs owing to I/O waiting or the like at the moment T2. This blocking 54 is detected by an appropriate blocking detecting means. Then, a blocking detection notice 56 is posted to the user-level process scheduler 10. When receiving the blocking detection notice 56, the remaining (CPU) time from a moment T3 to another moment T4 is allocated to a user process belonging to the time sharing class.

Figure 34:
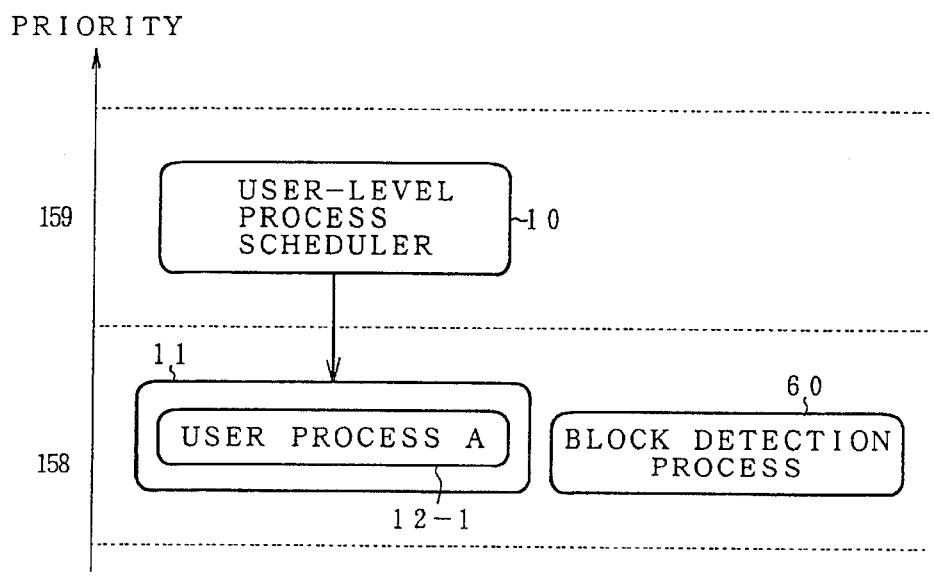
FIG. 34 is a diagram for illustrating the operating environment of a blocking detection process.
Figure 35:
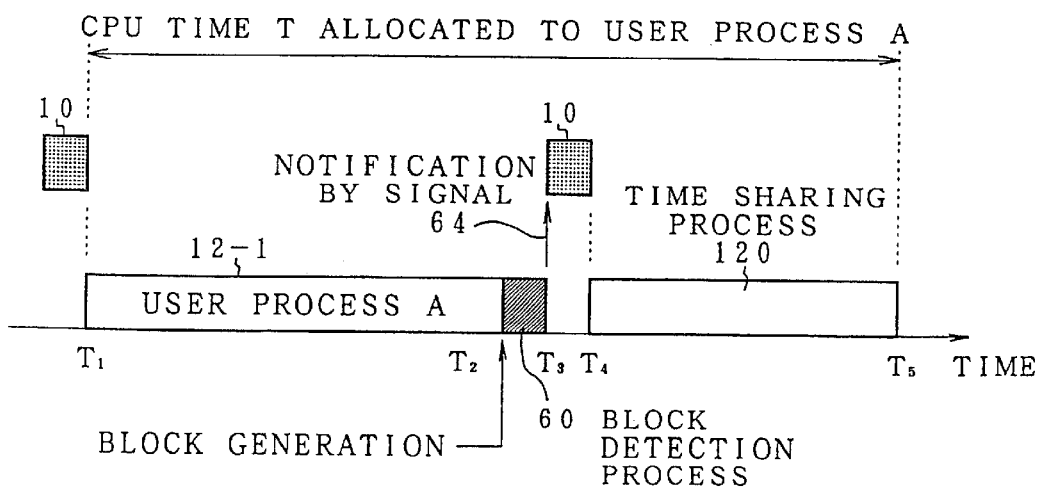
FIG. 35 is a diagram for illustrating a blocking detection and an operation performed in the blocking detection process.

FIG. 34 illustrates a blocking detection process (namely, an operation of detecting the blocking shown in FIG. 33). Further, the blocking detection process 60 is established at the priority of 158 which is equal to that of the user process 12-1 to be scheduled by the user-level process scheduler 10 having the priority of 159. In the case that a plurality of executable processes are present at a same priority of the real time class of the operating system Solaris 2.4supporting the scheduler of the present invention, an executable process is changed or switched through a round robin at each time quantum which is the minimum unit of the CPU allocation. Further, a time quantum can be established in each process in response to the priocntl system call. In the operating environment of FIG. 34, the user-level process scheduler 10 establishes the user process 12-1 and the blocking detection process 60 by using the following procedure. Further, as illustrated in FIG. 35, the blocking of the user process 12-1 is detected by the blocking detection process 60 and is posted to the user-level process scheduler 10 by using 6 the signal (handling) function of the operating system. Namely, the blocking detection process 60 is established by the user-level process scheduler of FIG. 34 as follows:

I. The priority of the user process 12-1 is set at 158;

II. The time quantum of the user process 12-1 is set as being equal to a time period which is equal to or longer than the CPU time allotted to the user process 12-1;

III. The user process 12-1 is put into a ready state;

IV. The priority of the blocking detection process 60 is set at 158;

V. The time quantum of the blocking detection process 60 is set as being equal to a suitable time;

VI. The blocking detection process 60 is put into a ready state; and

VII. The user process 12-1 is caused to sleep during the CPU time allotted thereto.

Figure 36:
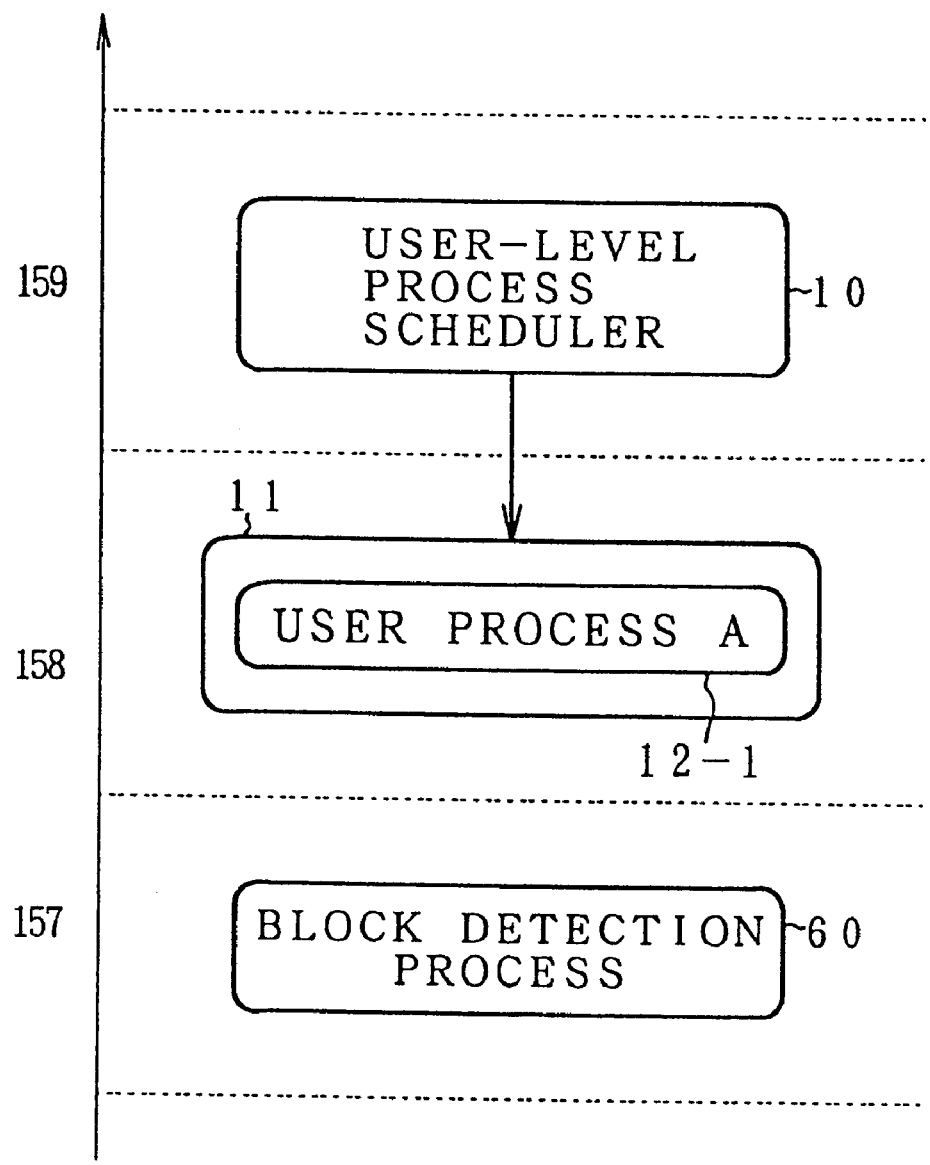
FIG. 36 is a diagram for illustrating another operating environment of the blocking detection process.

FIG. 36 illustrates another operating manner of the blocking detection process. In this case, the blocking detection process 60 is set at a lower priority (namely, 157) correspondingly to the user process 12-1 to be scheduled by the user-level process scheduler 10. Namely, it is detected by the blocking detection process 60 that the user process 12-1 is blocked. Then, the occurrence of the blocking of the user process 12-1 is posted to the user-level process scheduler 10 by using the signal (handling) function of the operating system. The setting of the user process 12-1 and the blocking detection process 60 of this case is carried out as follows:

I. The priority of the user process 12-1 is set at 158;

II. The user process 12-1 is put into a ready state;

III. The priority of the blocking detection process 60 is set at 157;

IV. The blocking detection process 60 is put into a ready state; and

V. The user process 12-1 sleeps for a time period during which this user processes is intended to operate.

The operation in the case of setting the blocking detection process 60 of FIG. 36 becomes similar to that in the case of FIG. 35.

Figure 37:
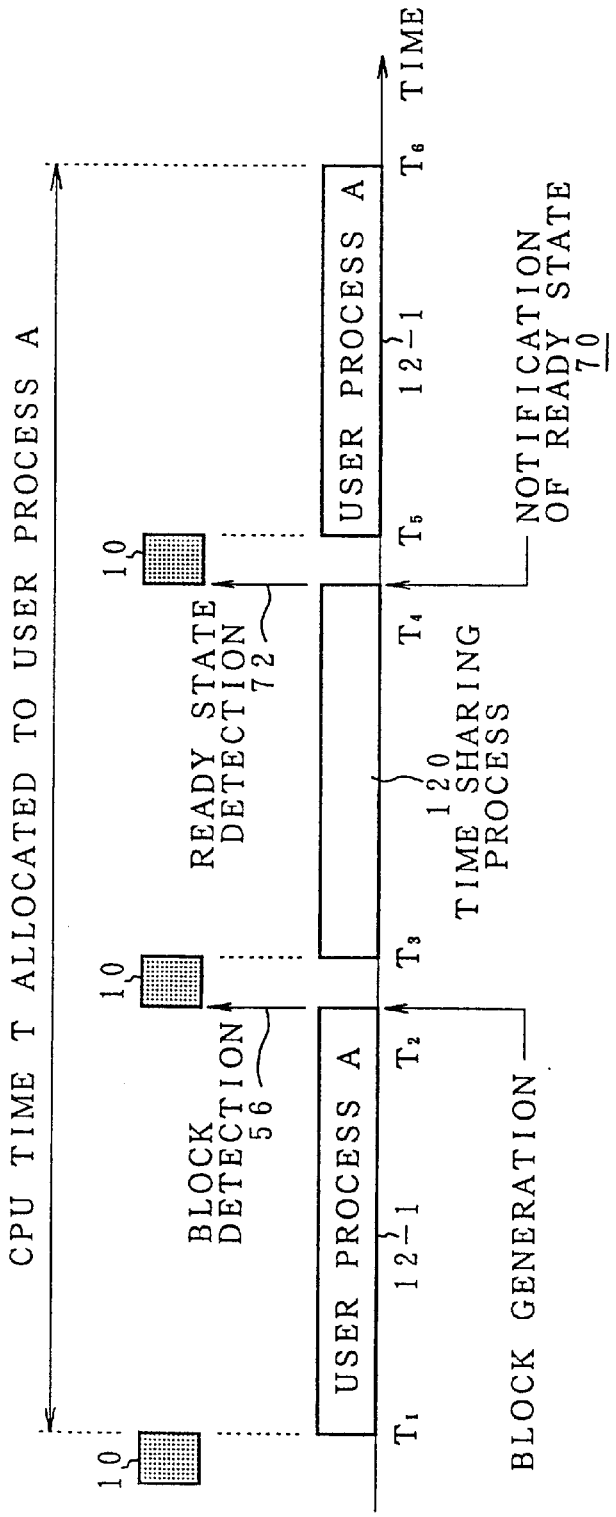
FIG. 37 is a diagram for illustrating the case that a ready state of a user process is detected after the blocking thereof is detected.

FIG. 37 illustrates the case that a user process is put into a ready state after the blocking thereof is detected within certain CPU time allocated to the user process. First, the user-level process scheduler 10 allocates a period of time from a moment T1 to another moment T6 to the user process 12-1 as the CPU (utilization) time. The user process 12-1 is, however, blocked owing to I/O waiting. In response to the blocking detection 68, the user-level process scheduler 10 allocates the remaining time from a moment T3 to the moment T6 to a process 120 belonging to the time sharing class. However, if the user process 12-1 is put into a ready state at a halfway moment T4, the appropriate detecting means posts the detected ready state, 72 to the user-level process scheduler 10. When receiving this notice representing the detection of the ready state, the user-level process scheduler 10 allocates a time period from a moment T5 to the moment T6 to user process 12-1 again. The detection of the ready state of the user process 12-1 of FIG. 32, which has been once blocked, is enabled by further using a notice sent from the operating system.

Figure 38A:
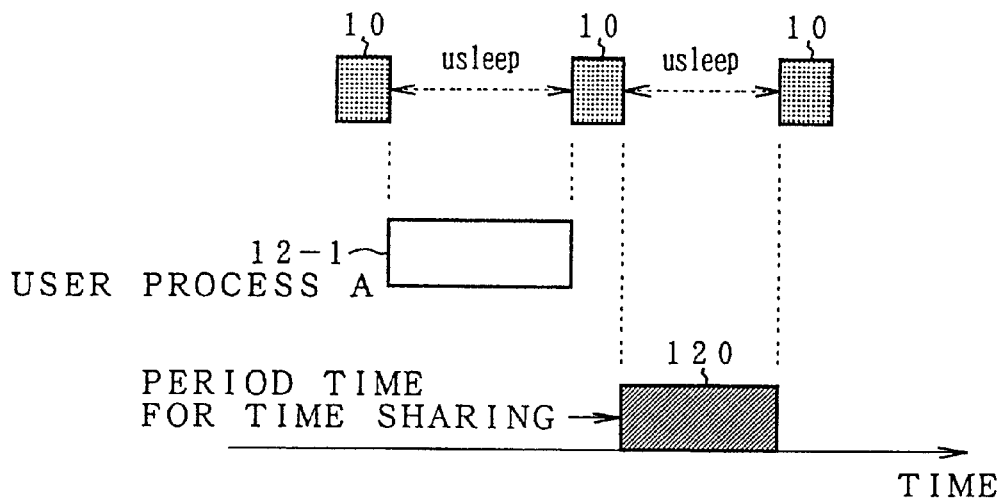
FIGS. 38A and 38B are diagrams for illustrating the creation (or generation) and termination of a user process.
Figure 38B:
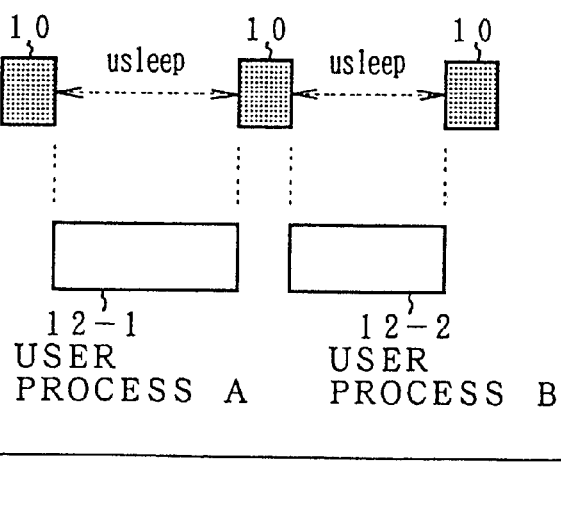

FIGS. 38A and 38B illustrate operations to be performed when the creation and termination of a user process are detected. First, FIG. 38A illustrates the case that only the user process 12-1 is caused to operate and a part of the CPU time is allocated to a time sharing process 120 (namely, a process belonging to the time sharing class). When a new user process 12-2 is created in this state, the creation of the user process 12-2 is detected as illustrated in FIG. 38B. Moreover, the CPU time allotted to the time sharing process is allocated to the user process 12-2. On the other hand, in the case that the user-level process scheduler 10 has allocated the CPU time to the user-processes 12-1 and 12-2 as illustrated in FIG. 38B and it is detected that the user process 12-2 is finished, the CPU time having been allotted to the user process 12-2 is allocated to the time sharing process 120. Thus, the operation is performed as illustrated in FIG. 38A.

Figure 39A:
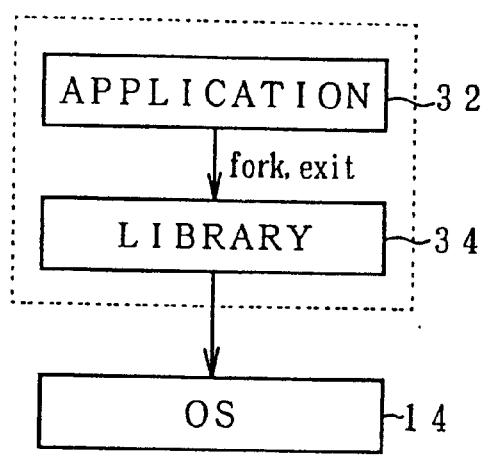
FIGS. 39A and 39B are diagrams for illustrating an application programs's operation of posting the creation (or generation) and termination of a user process to a user-level process scheduler by using a library.
Figure 39B:
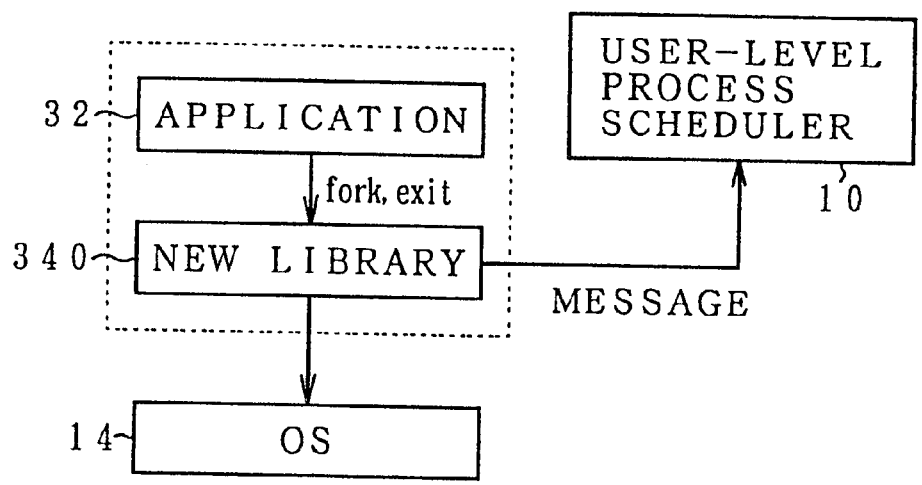

The creation and termination of the process as illustrated in FIGS. 38A and 38B are performed in response to the fork system call fork for creating the process and to the exit system call for terminating the process, respectively. In the case of an application program of FIG. 39A created by using C (programming) language, the creation and termination of a process are posted to the operating system 14 through the library 34. Moreover, in the case that there is provided the user-level process scheduler 10 of the present invention and the fork system call for creating a process and the exit system call for terminating the process are issued from the application program 32 as illustrated in FIG. 32B, a new library 340 having the function of communicating a message to the user-level process scheduler 10 is provided. Thus, when receiving the fork system call or the exit system call from the application program 32, the new library 340 can post the creation or termination of a process to the user-level process scheduler 10 by using a message provided as one of inter-process communication functions. The new library 340 is re-linked if statically linked when compiled. Further, this library is replaced with a dynamic link library if dynamically linked when executed. Consequently, there is no necessity of rewriting the application program 32. The operation of detecting the creation and termination of a user process in the manner as illustrated in FIG. 39B becomes similar to those illustrated in FIGS. 38A and 38B. Naturally, the creation and termination of a user process may be posted directly from the operating system 14 to the user-level process scheduler 10.

In this way, in accordance with the present invention, schedulers, such as a scheduler to ensure certain CPU utilization (ratio) needed for multi-media processing, can be implemented on a commercial operating system in the various manners. Further, a program behaving unreliably can be employed as an object of the scheduling. Namely, a scheduler, which is equivalent to a scheduler implemented in the operating system, can be implemented as a user-level scheduler.

Incidentally, the aforesaid embodiment of the present invention is provided by employing the operating system Solaris 2.4 introduced by Sun Microsystems, by way of example. Further, the present invention can be applied directly to process schedulers provided by employing other suitable operating systems which can provide fixed-priority scheduling processes, may be employed instead thereof. Moreover, in the case of the aforementioned embodiment (namely, the foregoing user-level process scheduler) of the present invention, by way of example, the time sharing scheduler is employed as a scheduler belonging to a scheduling class other than the scheduling class of the fixed-priority scheduler to which the user-level process scheduler of the present invention is linked. Of course, other variable-priority schedulers may be employed instead of such a scheduler.

Although the preferred embodiment of the present invention has been described above; it should be understood that the present invention is not limited thereto and that other modifications will be apparent to those skilled in the art without departing from the spirit of the invention.

The scope of the present invention, therefore, should be determined solely by the appended claims.

What is claimed is:

1. A computer-system process scheduler, which is supported by an operating system and establishes fixed priorities respectively corresponding to a plurality of processes to be scheduled, the priorities being able to be changed by designation sent from a user process, the computer process scheduler being adapted to allocate a CPU to executable ones of the processes in a descending order of the priorities thereof and to cause the process, to which the CPU is allocated, to operate, the computer-system process scheduler comprising:

a user-level process scheduler belonging to a user process and having a first priority and being operative to determine allocation of the CPU thereto and to request the operating system to execute the user process.

2. The computer-system process scheduler according to claim 1, wherein the user-level process scheduler is linked to each of a plurality of user processes having the first priority and is operative to schedule the user process corresponding thereto and to cause a corresponding one of the user processes to operate.

3. The computer-system process scheduler according to claim 1, wherein the user-level process scheduler having the first priority provides a user-level process scheduler having a second priority in a group of user processes scheduled by the user-level process scheduler having the first priority and is operative to hierarchically schedule other groups of user processes from those of high-order groups to those of low-order groups and cause the groups of the user processes to operate.

4. The computer-system process scheduler according to claim 1, which further comprises a plurality of user schedulers having the first priority, each of which individually schedules a corresponding group of user processes and-causes the corresponding group of user processes to operate.

5. The computer-system process scheduler according to claim 1, wherein the control portion of said user-level process scheduler comprises:

a process execution control portion requesting the operating system to execute, suspend or resume a designated user process, in accordance with an instruction issued from the class change instruction portion according to a demand made by a user process, or in accordance with an instruction issued from the process execution instructing portion by referring to the process management table;

a process priority control portion requesting the operating system to execute, suspend or resume a user process by changing a priority of a designated user process into the first priority and executing the user process and suspending another user process, whose priority is changed into a low priority, in accordance with an instruction issued from the class change instruction portion according to a demand made by a user process, or in accordance with an instruction issued from the process execution instructing portion by referring to the process management table; and a class change control portion requesting the operating system to execute, suspend or resume a designated user process, in accordance with an instruction issued from the class change instruction portion according to a demand made by a user process, or in accordance with an instruction issued from the process execution instructing portion by referring to the process management table, in the case that the user-level process scheduler according to a process state, in addition to and differently from a real time class having a fixed priority of a high priority range.

6. The computer-system process scheduler according to claim 5, wherein the class change instructing portion refers to the process management table and obtains a total of CPU time required by a group of user processes, which are currently in an admitted state, in response to a demand for admission, which includes designation of CPU utilization time of a user process, wherein if a total of the required CPU time is equal to or less than a predetermined time, the class change instructing portion permits the user process to admit the group, wherein if the total of the required CPU time exceeds the predetermined time, the class change instructing portion rejects the demand for admission.

7. The computer-system process scheduler according to claim 5, wherein in case of permitting a user process to admit, the class change instructing portion instructs the process execution control portion to change a state of the user process, which has made the demand for admission, into a suspended state, and further instructs the class change control portion to change a class of the user process from a time sharing class, which has a dynamic priority of a low priority range, into a real time class having a fixed priority of a high priority range, and furthermore instructs the process priority control portion to change a priority of the user process into a second priority, wherein after the user process is registered in the process management table, the class change instructing portion posts permission for admission to the user process.

8. The computer-system process scheduler according to claim 5, wherein in case of permitting a user process to admit, the class change instructing portion instructs the class change control portion to change a class of the user process into a real time class, and further instructs the process priority control portion to change a priority of the user process into a priority which is lower than the first priority, wherein after the user process is registered in the process management table, the class change instructing portion posts permission for admission to the user process.

9. The computer-system process scheduler according to claim 5, wherein in case of permitting a user process to admit, the class change instructing portion instructs the class change control portion to change a class of the user process into a time sharing class, wherein after the user process is registered in the process management table, the class change instructing portion posts permission for admission to the user process.

10. The computer-system process scheduler according to claim 5, wherein in response to a demand for exit, which has been made by a user process, the class change instructing portion deletes the user process from the process management table and instructs the class change control portion to change a class of the user process, which has made the demand for exit, into a time sharing class.

11. The computer-system process scheduler according to claim 5, wherein in response to a notice from a user process, the class change instructing portion handles admission and exit of a new user process.

12. The computer-system process scheduler according to claim 5, wherein in response to a notice from the operating system, the class change instructing portion handles admission and exit of a new user process.

13. The computer-system process scheduler according to claim 5, wherein the user-level process scheduler receives information, which concerns a change request, to be given to the process execution control portion, the class change control portion and the process priority control portion, and further receives a request from an application program, through a library linked to the application program, and thereafter requests the operating system to perform a change in the user process.

14. The computer-system process scheduler according to claim 5, wherein scheduling specifications of a change request to be given to the process execution control portion, the class change control portion and the process priority control portion are established by a user process, wherein a change in the user process is requested to the operating system by posting a change request to the user-level process scheduler according to the scheduling specifications of the user process.

15. The computer-system process scheduler according to claim 1, wherein a user process to be scheduled by the user-level process scheduler consists of a plurality of threads, wherein the plurality of threads are scheduled by a thread scheduler which is a part of the user process.

16. The computer-system process scheduler according to claim 1, wherein when allocating CPU time to one or more user processes registered in a process management table, the user-level process scheduler corresponding to a process user requests the operating system to execute or suspend a user process, or change a priority of a user process or change a class, to which a user process belongs, in such a manner that only one user process is present in a period of time during which the CPU is allocated to a user process.

17. The computer-system process scheduler according to claim 1, wherein when allocating CPU time to one or more user processes registered in a process management table, the user-level process scheduler corresponding to a process user requests the operating system to execute or suspend a user process, or change a priority of a user process or change a class, to which a user process belongs, in such a manner that a plurality of user processes are present in a time sharing manner in a period of time during which the CPU is allocated to user processes.

18. The computer-system process scheduler according to claim 1, wherein the user-level process scheduler ensures operations of a plurality of user processes in a constant time by allocating CPU time to the plurality of user processes and the user-level process scheduler itself serially in the constant time.

19. The computer-system process scheduler according to claim 1, wherein the user-level process scheduler ensures operations of a plurality of user processes by setting a constant period and allocating CPU time to the plurality of user processes and the user-level process scheduler itself serially in each constant period.

20. The computer-system process scheduler according to claim 19, wherein in case that operating periods of a plurality of user processes are different from one another, the user-level process scheduler ensures operations of a plurality of user processes by determining a scheduling period from a combination of the different operating periods, and allocating CPU time to the plurality of user processes serially in the scheduling period.

21. The computer-system process scheduler according to claim 1, wherein when a ratio of total CPU time, which is allocated to a plurality of user processes, to a constant time or to a constant period is equal to or less than a predetermined value, the user-level process scheduler permits allocation of CPU time to another user process, wherein when the ratio exceeds the predetermined value, the user-level process scheduler rejects allocation of CPU time to another user process.

22. The computer-system process scheduler according to claim 1, wherein in case that CPU time is allocated to a user process in a constant time or a constant period, the user-level process scheduler allocates continuous CPU time to a user process.

23. The computer-system process scheduler according to claim 1, wherein in case that CPU time is allocated to a plurality of user processes in a constant time or a constant period, the user-level process scheduler allocates CPU time to the plurality of user processes, respectively, by dividing each CPU time to be allotted to corresponding one of the plurality of user processes.

24. The computer-system process scheduler according to claim 1, wherein in case that user processes registered in a process management table include a user process belonging to a real time class having a fixed priority of a high priority range and further include a user process belonging to a time sharing class, in which a priority of a low priority range is dynamically changed, the use-level process scheduler limits allocation of CPU time to the user process belonging to the real time class and allocates CPU time to the user process belonging to the time sharing class.

25. The computer-system process scheduler according to claim 1, wherein the user-level process scheduler detects suspension of a user process and then enables another user process to operate.

26. The computer-system process scheduler according to claim 1, wherein when allocating CPU time to a user process, the user-level process scheduler provides a blocking detection process, which can be executed at a same priority as of the user process, in addition to the user process, wherein when the user process is blocked, the user-level process scheduler allocates CPU time to the blocking detection process and causes the blocking detection process to send a notice representing an occurrence of blocking of the user process to the user-level process scheduler, wherein the user-level process scheduler recognizes from the notice that the user process is suspended, and enables another user process to be executed.

27. The computer-system process scheduler according to claim 1, wherein when allocating CPU time to a user process, the user-level process scheduler provides a blocking detection process, which can be executed at a low priority, in addition to the user process, wherein when the user process is blocked, the user-level process scheduler allocates CPU time to the blocking detection process and causes the blocking detection process to send a notice representing an occurrence of blocking of the user process to the user-level process scheduler, wherein the user-level process scheduler recognizes from the notice that the user process is suspended, and enables another user process to be executed.

28. The computer-system process scheduler according to claim 1, wherein the user-level process scheduler detects that a user process being blocked becomes put into a ready state, and causes the user process to operate.

29. The computer-system process scheduler according to claim 1, wherein the user-level process scheduler detects a notice, which is issued from the operating system and indicates an occurrence of blocking a user process, or a notice indicating resumption of the user process by recovering the blocked user process, and then executes or suspends another user process.

\* \* \* \* \*

UNITED STATES PATENT AND TRADEMARK OFFICE
CERTIFICATE OF CORRECTION

PATENT NO.    : 6,668,269 B1                                          Page 1 of 1
DATED         : December 23, 2003
INVENTOR(S)   : Jun Kamada et al.

It is certified that error appears in the above-identified patent and that said Letters Patent is hereby corrected as shown below:

Title page,
Item [56], References Cited, OTHER PUBLICATIONS, please add
-- Yu et al., "Scheduling Parallelizable Imprecise Computations on Multiprocessors", IEEE 1991 --

Signed and Sealed this

Sixth Day of April, 2004

JON W. DUDAS
*Acting Director of the United States Patent and Trademark Office*